(12) United States Patent
Thrash

(10) Patent No.: US 11,351,815 B2
(45) Date of Patent: Jun. 7, 2022

(54) BICYCLE CASSETTE WITH CLAMPING CONNECTION

(71) Applicant: The Hive Global, Inc., Taichung (TW)

(72) Inventor: Greg Thrash, Petaluma, CA (US)

(73) Assignee: The Hive Global, Inc., Taichung (TW)

( * ) Notice: Subject to any disclaimer, the term of this patent is extended or adjusted under 35 U.S.C. 154(b) by 188 days.

(21) Appl. No.: 16/104,635

(22) Filed: Aug. 17, 2018

(65) Prior Publication Data

US 2019/0054765 A1 Feb. 21, 2019

Related U.S. Application Data

(60) Provisional application No. 62/548,210, filed on Aug. 21, 2017.

(51) Int. Cl.
| | |
|---|---|
| *B60B 27/04* | (2006.01) |
| *B62M 9/10* | (2006.01) |
| *F16H 57/00* | (2012.01) |
| *B60B 27/02* | (2006.01) |

(52) U.S. Cl.
CPC .......... *B60B 27/04* (2013.01); *B60B 27/023* (2013.01); *B60B 27/047* (2013.01); *B62M 9/10* (2013.01); *F16H 57/0025* (2013.01); *B60B 2320/10* (2013.01)

(58) Field of Classification Search
CPC .......... B62M 9/10; B62M 9/12; B62M 9/121; F16H 55/30; F16H 7/06
USPC ....................................................... 474/160
See application file for complete search history.

(56) References Cited

U.S. PATENT DOCUMENTS

| | | |
|---|---|---|
| 512,729 A | 1/1894 | Archer |
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |

(Continued)

FOREIGN PATENT DOCUMENTS

| | | |
|---|---|---|
| AT | 397641 B | 5/1994 |
| CN | 2115968 U | 9/1992 |

(Continued)

OTHER PUBLICATIONS

The European Search Report for European Application No. 17 77 0865 dated Jun. 13, 2019.

(Continued)

*Primary Examiner* — Henry Y Liu

(74) *Attorney, Agent, or Firm* — Haverstock & Owens, A Law Corporation

(57) ABSTRACT

A bicycle cassette comprises a clampstyle connection for connecting the bicycle cassette to a bicycle hub driver body. The bicycle cassette is attached to a bicycle hub driver body by incorporating a clamp structure into one portion of the cassette, which then rigidly clamps onto the driver body of the bicycle hub. In addition, when combined with a bayonet style attachment structure between two parts of the cassette, it allows for the use of a smaller sprocket on one segment of the cassette. Specifically, it allows a small 9 or 10 tooth sprocket to overhang the cassette driver body on a bicycle hub, by attaching the small cog assembly to a larger cog assembly using a bayonet style attachment.

20 Claims, 17 Drawing Sheets

(56) References Cited

U.S. PATENT DOCUMENTS

| | | |
|---|---|---|
| 579,479 A | 3/1897 | Gobbler |
| 590,685 A | 9/1897 | Matthews |
| 595,388 A | 12/1897 | Hanson |
| 598,325 A | 2/1898 | McIntyre |
| 614,900 A | 11/1898 | Seaver |
| 616,167 A | 12/1898 | Walker |
| 620,266 A | 2/1899 | Woodiska |
| 658,400 A | 9/1900 | Roberts |
| 666,679 A | 1/1901 | Kraus |
| 811,799 A | 2/1906 | Seidemann |
| 848,870 A | 4/1907 | Weller |
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,015,430 A | 9/1935 | Matthews |
| 2,024,499 A | 12/1935 | Baron |
| 2,228,770 A | 1/1941 | Robert |
| 2,317,070 A | 4/1943 | Robert |
| 2,567,785 A | 9/1951 | Rieger |
| 2,568,443 A | 9/1951 | Gemer |
| 2,751,797 A | 6/1956 | Pearl |
| 3,184,993 A | 5/1965 | Swenson |
| 3,185,439 A | 5/1965 | Inaba |
| 3,303,720 A | 2/1967 | Jaulmes |
| 3,332,297 A | 7/1967 | Morse |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,748,916 A | 7/1973 | Morse |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,933,373 A | 1/1976 | Gammelgaard |
| 3,964,343 A | 6/1976 | Lauterbach |
| 3,973,447 A | 8/1976 | Nagano |
| 4,016,357 A | 4/1977 | Abrahamsen |
| 4,037,484 A | 7/1977 | Morse |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,324,323 A | 4/1982 | Campagnolo |
| 4,330,137 A | 5/1982 | Nagano |
| 4,337,933 A | 7/1982 | Egami |
| 4,377,952 A | 3/1983 | Gamondes |
| 4,380,445 A * | 4/1983 | Shimano ................ B62M 9/105 474/144 |
| 4,398,434 A | 8/1983 | Kimura |
| 4,429,448 A | 2/1984 | Butz |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A * | 9/1984 | Bottini .................... B62M 9/10 192/64 |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,548,422 A | 10/1985 | Michel et al. |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkie |
| D298,613 S | 11/1988 | McMurtey |
| 4,789,176 A | 12/1988 | Carrol |
| 4,791,692 A | 12/1988 | Collins |
| 4,803,894 A | 2/1989 | Howell |
| 4,811,626 A | 3/1989 | Bezin |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,856,801 A | 8/1989 | Hollingsworth |
| 4,873,890 A | 10/1989 | Nagano |
| 4,882,946 A | 11/1989 | Beyl |
| 4,893,523 A | 1/1990 | Lennon |
| 4,898,063 A | 2/1990 | Sampson |
| 4,900,050 A | 2/1990 | Bishop et al. |
| 4,905,541 A | 3/1990 | Man |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 4,986,949 A | 1/1991 | Trimble |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,019,312 A | 5/1991 | Bishop |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,125,288 A | 6/1992 | Amiet |
| 5,125,489 A | 6/1992 | Cha |
| 5,179,873 A | 1/1993 | Girvin |
| 5,188,384 A | 2/1993 | van Raemdonck |
| 5,194,051 A * | 3/1993 | Nagano .................... B62M 9/10 474/160 |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,215,322 A | 6/1993 | Enders |
| 5,259,270 A | 11/1993 | Lin |
| 5,320,582 A | 6/1994 | Takeda |
| 5,324,100 A | 6/1994 | James |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,435,869 A | 7/1995 | Christensen |
| 5,451,071 A | 9/1995 | Pong et al. |
| 5,460,576 A | 10/1995 | Barnett |
| 5,496,222 A | 3/1996 | Kojima |
| 5,497,680 A | 3/1996 | Nagano |
| 5,503,600 A | 4/1996 | Berecz |
| 5,505,111 A | 4/1996 | Nagano |
| 5,522,282 A | 6/1996 | Nagano |

(56) References Cited

U.S. PATENT DOCUMENTS

| | | |
|---|---|---|
| 5,540,118 A | 7/1996 | Calendrille, Jr. |
| 5,544,907 A | 8/1996 | Lin et al. |
| 5,549,396 A | 8/1996 | Chiang |
| 5,620,384 A | 4/1997 | Kojima |
| 5,626,060 A | 5/1997 | Lin |
| 5,632,940 A | 5/1997 | Whatley |
| 5,644,953 A | 7/1997 | Leng |
| 5,676,616 A | 10/1997 | Hara |
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,788,593 A | 8/1998 | Tiong |
| 5,791,202 A | 8/1998 | Karsdon |
| 5,803,476 A | 9/1998 | Olson et al. |
| 5,806,379 A | 9/1998 | Nagano |
| 5,809,844 A | 9/1998 | Durham |
| 5,816,377 A | 10/1998 | Nakamura |
| 5,819,599 A | 10/1998 | Yamanaka |
| 5,846,148 A | 12/1998 | Fuji |
| 5,893,299 A | 4/1999 | Yamanaka |
| 5,927,155 A | 7/1999 | Jackson |
| 5,935,034 A | 8/1999 | Campagnolo |
| 5,941,135 A | 8/1999 | Schlanger |
| 5,943,795 A | 8/1999 | Ueda |
| 5,954,604 A * | 9/1999 | Nakamura ............... B62M 9/10 474/158 |
| 6,003,889 A | 12/1999 | Shalom |
| 6,014,913 A | 1/2000 | Masahiro |
| 6,014,914 A | 1/2000 | Ueda |
| 6,039,665 A | 3/2000 | Nakamura |
| 6,058,803 A | 5/2000 | Yamanaka |
| 6,059,171 A | 5/2000 | Yamanaka et al. |
| 6,059,378 A | 5/2000 | Dougherty |
| 6,060,982 A | 5/2000 | Holtrop |
| 6,083,132 A | 7/2000 | Walker |
| 6,095,691 A | 8/2000 | Chiang |
| 6,102,821 A | 8/2000 | Nakamura |
| 6,117,032 A | 9/2000 | Nankou |
| 6,165,092 A | 12/2000 | Bramham |
| 6,202,506 B1 | 3/2001 | Storck et al. |
| 6,203,459 B1 | 3/2001 | Calendrille, Jr. |
| 6,264,575 B1 * | 7/2001 | Lim ..................... B62M 9/10 192/64 |
| 6,266,990 B1 | 7/2001 | Shook et al. |
| 6,305,243 B1 | 10/2001 | Chiang |
| 6,314,834 B1 | 11/2001 | Smith et al. |
| 6,332,853 B1 | 12/2001 | Bowman |
| 6,354,973 B1 | 3/2002 | Barnett |
| 6,382,381 B1 | 5/2002 | Okajima et al. |
| 6,416,434 B1 | 7/2002 | Calendrille, Jr. |
| 6,428,437 B1 | 8/2002 | Schlanger |
| 6,488,603 B2 | 12/2002 | Lim et al. |
| 6,490,948 B2 | 12/2002 | Tanaka |
| 6,520,048 B2 | 2/2003 | Chen |
| 6,533,690 B2 | 3/2003 | Barnett |
| 6,564,675 B1 | 5/2003 | Jiang |
| 6,612,201 B1 | 9/2003 | Chen |
| 6,637,292 B2 | 10/2003 | Chu |
| 6,647,826 B2 | 11/2003 | Okajima |
| 6,725,742 B2 | 4/2004 | Bremer |
| 6,729,204 B1 | 5/2004 | Chen |
| 6,805,373 B2 | 10/2004 | Singenberger et al. |
| 6,834,309 B2 | 12/2004 | Leung |
| 6,848,700 B1 | 2/2005 | Fritschen |
| 6,988,427 B2 | 1/2006 | Yamanaka |
| 7,011,592 B2 | 3/2006 | Shahana et al. |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,118,505 B2 | 10/2006 | Lee |
| 7,131,656 B2 | 11/2006 | Valle |
| 7,174,807 B2 | 2/2007 | Bryne |
| 7,240,587 B2 | 7/2007 | Plassiard |
| 7,263,914 B2 | 9/2007 | Ording et al. |
| 7,334,500 B2 | 2/2008 | Tseng |
| 7,523,685 B2 | 4/2009 | French |
| 7,562,604 B2 | 7/2009 | Fukui |
| 7,610,832 B2 | 11/2009 | Dal Pra' |
| 7,650,817 B2 | 1/2010 | Shiraishi et al. |
| 7,753,157 B1 | 7/2010 | Woods |
| 7,770,492 B2 | 8/2010 | French |
| 7,775,128 B2 | 8/2010 | Roessingh et al. |
| 7,886,947 B2 | 2/2011 | Campagnolo |
| 7,931,553 B2 | 4/2011 | Tokuyama |
| 7,959,529 B2 * | 6/2011 | Braedt .................. B62M 9/10 474/160 |
| 8,024,993 B2 | 9/2011 | Dal Pra' et al. |
| 8,025,304 B2 | 9/2011 | Smith |
| 8,066,293 B2 | 11/2011 | Meggiolan |
| 8,197,371 B2 * | 6/2012 | DAluisio ............. B62M 9/12 474/160 |
| 8,235,849 B2 | 8/2012 | Cranston et al. |
| 8,302,504 B2 | 11/2012 | Dal Pra' |
| 8,413,769 B2 | 4/2013 | Thrash |
| 8,491,429 B2 | 7/2013 | Cranston et al. |
| 8,561,500 B2 | 10/2013 | D'Aluisio |
| 8,578,816 B2 | 11/2013 | Lin |
| 8,590,421 B2 | 11/2013 | Meggiolan et al. |
| 8,616,084 B2 | 12/2013 | Meggiolan |
| 8,641,151 B2 | 2/2014 | Kamada |
| 8,663,044 B2 * | 3/2014 | Lin ..................... B62M 9/10 474/160 |
| 8,689,662 B2 | 4/2014 | Pasqua et al. |
| 8,707,823 B2 | 4/2014 | Dal Pra' |
| 8,770,061 B2 | 7/2014 | Meggiolan et al. |
| 8,820,192 B2 | 9/2014 | Staples et al. |
| 8,863,616 B2 | 10/2014 | Ciavatta et al. |
| 8,888,629 B2 | 11/2014 | Ji |
| 8,911,314 B2 * | 12/2014 | Braedt .................. B62M 9/10 474/160 |
| 8,979,685 B2 | 3/2015 | Weagle |
| 9,003,921 B2 | 4/2015 | Weagle |
| 9,011,282 B2 * | 4/2015 | Staples ................. B62M 9/12 474/160 |
| 9,260,158 B2 | 2/2016 | Braedt |
| 9,458,871 B2 | 10/2016 | Ishizaki |
| 10,160,030 B2 | 12/2018 | Earle et al. |
| 10,221,887 B2 | 3/2019 | Dubois et al. |
| 10,259,526 B2 | 4/2019 | Hsieh |
| 10,260,568 B2 | 4/2019 | Chen |
| 10,480,571 B2 | 11/2019 | Dubois et al. |
| 10,562,588 B2 | 2/2020 | Thrash et al. |
| 11,142,280 B2 | 10/2021 | Dubois et al. |
| 2001/0049976 A1 | 12/2001 | Dodman |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0041689 A1 | 3/2003 | Chu |
| 2003/0051576 A1 | 3/2003 | Muraoka |
| 2003/0064844 A1 | 4/2003 | Lin |
| 2003/0171180 A1 | 9/2003 | Shahana et al. |
| 2003/0183036 A1 | 10/2003 | Chou |
| 2003/0197346 A1 | 10/2003 | Singenberger et al. |
| 2004/0009835 A1 | 1/2004 | Heim |
| 2004/0034043 A1 | 2/2004 | Katzhendler et al. |
| 2004/0037628 A1 | 2/2004 | Meggiolan |
| 2004/0182197 A1 | 9/2004 | Chiang |
| 2004/0187635 A1 | 9/2004 | Bryne |
| 2004/0200314 A1 | 10/2004 | Hermansen et al. |
| 2004/0211289 A1 | 10/2004 | Chiang et al. |
| 2004/0254038 A1 | 12/2004 | Chamberlain |
| 2005/0005729 A1 | 1/2005 | Chen |

(56) References Cited

U.S. PATENT DOCUMENTS

| | | |
|---|---|---|
| 2005/0012298 A1 | 1/2005 | Dal Pra et al. |
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0081678 A1 | 4/2005 | Smith et al. |
| 2005/0081679 A1 | 4/2005 | Chen |
| 2005/0090349 A1 | 4/2005 | Lee |
| 2005/0145061 A1 | 7/2005 | Ording et al. |
| 2005/0178236 A1 | 8/2005 | Crozet et al. |
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0063624 A1 | 3/2006 | Voss |
| 2006/0075846 A1 | 4/2006 | Valle |
| 2006/0081088 A1 | 4/2006 | Muraoka |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Feltrin |
| 2007/0049436 A1 | 3/2007 | Kamada |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0222172 A1 | 9/2007 | Chen |
| 2007/0235986 A1 | 10/2007 | Weagle |
| 2007/0254758 A1 | 11/2007 | Chen |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |
| 2008/0004143 A1* | 1/2008 | Kanehisa ............... B62M 9/10 474/160 |
| 2008/0005905 A1 | 1/2008 | Valle et al. |
| 2008/0058144 A1 | 3/2008 | Oseto et al. |
| 2008/0152460 A1 | 6/2008 | Watanabe |
| 2008/0224440 A1 | 9/2008 | Masuda et al. |
| 2008/0231014 A1* | 9/2008 | Braedt ............... B62M 9/10 280/260 |
| 2008/0234082 A1* | 9/2008 | Braedt ............... B62M 9/10 474/116 |
| 2008/0272572 A1 | 11/2008 | Tsai |
| 2008/0289927 A1 | 11/2008 | Ji |
| 2008/0307652 A1 | 12/2008 | Chiang |
| 2009/0042682 A1 | 2/2009 | Dal |
| 2009/0056495 A1 | 3/2009 | Bischoff et al. |
| 2009/0056496 A1 | 3/2009 | Dodman et al. |
| 2009/0078081 A1 | 3/2009 | French |
| 2009/0095122 A1 | 4/2009 | Weagle |
| 2009/0145262 A1 | 6/2009 | Pasqua et al. |
| 2009/0151509 A1 | 6/2009 | French |
| 2009/0191996 A1 | 7/2009 | D'Aluisio |
| 2009/0236777 A1 | 9/2009 | Chiang |
| 2009/0243250 A1 | 10/2009 | Chiang |
| 2009/0261553 A1 | 10/2009 | Meggiolan |
| 2010/0009794 A1 | 1/2010 | Chiang |
| 2010/0058889 A1 | 3/2010 | Dal Pra |
| 2010/0064845 A1 | 3/2010 | French |
| 2010/0099530 A1 | 4/2010 | Chiang et al. |
| 2010/0229675 A1 | 9/2010 | Dodman et al. |
| 2010/0236356 A1 | 9/2010 | Man |
| 2010/0275724 A1 | 11/2010 | Staples et al. |
| 2010/0295265 A1 | 11/2010 | Burdick |
| 2011/0011202 A1 | 1/2011 | Lin |
| 2011/0105263 A1 | 5/2011 | Braedt |
| 2011/0130233 A1 | 6/2011 | Tokuyama |
| 2011/0140390 A1 | 6/2011 | Kuroiwa et al. |
| 2011/0290069 A1 | 12/2011 | Lin |
| 2012/0067675 A1 | 3/2012 | Thrash |
| 2012/0119565 A1 | 5/2012 | Kamada |
| 2012/0225745 A1* | 9/2012 | Oishi ............... B62M 9/125 474/160 |
| 2012/0260767 A1 | 10/2012 | D'Aluisio |
| 2012/0302384 A1* | 11/2012 | Braedt ............... B62M 9/10 474/160 |
| 2013/0053195 A1 | 2/2013 | Emura et al. |
| 2013/0053196 A1 | 2/2013 | Emura et al. |
| 2013/0068066 A1 | 3/2013 | Staples et al. |
| 2013/0114999 A1 | 5/2013 | Ostling |
| 2013/0225343 A1* | 8/2013 | Spahr ............... B60B 27/023 474/160 |
| 2014/0157951 A1 | 6/2014 | Dubois et al. |
| 2014/0179474 A1* | 6/2014 | Florczyk ............... F16H 55/30 474/160 |
| 2014/0345419 A1 | 11/2014 | Staples et al. |
| 2015/0024884 A1* | 1/2015 | Braedt ............... F16H 9/24 474/78 |
| 2015/0210353 A1* | 7/2015 | Tokuyama ............... B62M 9/12 474/160 |
| 2016/0167737 A1* | 6/2016 | Tokuyama ............... B62M 9/10 474/160 |
| 2016/0176477 A1* | 6/2016 | Bernardele ............... B62M 9/12 474/160 |
| 2016/0236749 A1 | 8/2016 | Cody |
| 2016/0272002 A1* | 9/2016 | Earle ............... B21D 53/28 |
| 2017/0057598 A1* | 3/2017 | Thrash ............... B62M 9/10 |
| 2017/0101124 A1* | 4/2017 | Assmann ............... F16D 1/10 |
| 2017/0274960 A1 | 9/2017 | Dubois et al. |
| 2017/0314665 A1* | 11/2017 | Garcia ............... B60K 25/02 |
| 2018/0022415 A1* | 1/2018 | Oishi ............... F16D 1/10 474/160 |
| 2018/0257742 A1 | 9/2018 | Chen |
| 2018/0297664 A1* | 10/2018 | Fukumori ............... B62M 9/10 |
| 2018/0346064 A1* | 12/2018 | Fujita ............... B60B 27/023 |
| 2019/0054765 A1 | 2/2019 | Thrash |
| 2019/0154083 A1 | 5/2019 | Dubois et al. |
| 2019/0233051 A1 | 8/2019 | Carrasco Vergara |
| 2019/0241233 A1 | 8/2019 | Tavares Miranda |
| 2020/0140034 A1 | 5/2020 | Thrash et al. |
| 2020/0354016 A1 | 11/2020 | Di Serio |
| 2021/0094642 A1 | 4/2021 | Dubois et al. |

FOREIGN PATENT DOCUMENTS

| | | |
|---|---|---|
| CN | 1080902 A | 1/1994 |
| CN | 2169593 Y | 6/1994 |
| CN | 2170254 Y | 6/1994 |
| CN | 2183329 Y | 11/1994 |
| CN | 2188541 Y | 2/1995 |
| CN | 2206250 Y | 8/1995 |
| CN | 2210849 Y | 10/1995 |
| CN | 1112068 A | 11/1995 |
| CN | 2277928 Y | 4/1998 |
| CN | 2279303 Y | 4/1998 |
| CN | 1186751 A | 7/1998 |
| CN | 2409135 Y | 12/2000 |
| CN | 2409136 Y | 12/2000 |
| CN | 2428396 Y | 5/2001 |
| CN | 2434218 Y | 6/2001 |
| CN | 1330015 A | 1/2002 |
| CN | 2470233 Y | 1/2002 |
| CN | 2478916 Y | 2/2002 |
| CN | 1342562 A | 4/2002 |
| CN | 2509074 Y | 9/2002 |
| CN | 1439567 A | 9/2003 |
| CN | 1453179 A | 11/2003 |
| CN | 1463881 A | 12/2003 |
| CN | 2683516 Y | 3/2005 |
| CN | 1663872 A | 9/2005 |
| CN | 2749776 Y | 1/2006 |
| CN | 2782543 Y | 5/2006 |
| CN | 2806294 Y | 8/2006 |
| CN | 1864888 A | 11/2006 |

(56) References Cited

FOREIGN PATENT DOCUMENTS

| | | |
|---|---|---|
| CN | 1907802 A | 2/2007 |
| CN | 1927649 A | 3/2007 |
| CN | 101054105 A | 10/2007 |
| CN | 200995764 Y | 12/2007 |
| CN | 100379506 C | 4/2008 |
| CN | 201179942 Y | 1/2009 |
| CN | 201712753 U | 1/2011 |
| CN | 201863981 U | 6/2011 |
| CN | 102372065 A | 3/2012 |
| CN | 103129585 A | 3/2012 |
| CN | 202670040 U | 1/2013 |
| CN | 202827970 U | 3/2013 |
| CN | 203078709 U | 7/2013 |
| CN | 203111435 U | 8/2013 |
| CN | 103448859 A | 12/2013 |
| CN | 203410583 U | 1/2014 |
| CN | 203593074 U | 5/2014 |
| CN | 105564545 A | 5/2016 |
| CN | ZL 2016800500067 | 5/2021 |
| DE | 2655447 A1 | 6/1977 |
| DE | 3017771 A1 | 11/1981 |
| DE | 1002574 A1 | 1/1991 |
| DE | 9408910.8 U1 | 9/1994 |
| DE | 29600548 U1 | 4/1996 |
| DE | 19601125 A1 | 7/1997 |
| DE | 29623671 U1 | 4/1999 |
| DE | 19751879 A1 | 5/1999 |
| DE | 19755950 A1 | 6/1999 |
| DE | 10032778 A1 | 1/2002 |
| DE | 20116764 U1 | 1/2002 |
| DE | 10342638 A1 | 7/2005 |
| DE | 202008004243 U1 | 7/2008 |
| DE | 102007028897 A1 | 1/2009 |
| DE | 102009006101 A1 | 7/2009 |
| DE | 102016002706 A1 | 9/2017 |
| DE | 10201621865 A1 | 12/2017 |
| EP | 0 012 568 A1 | 6/1980 |
| EP | 0510371 A1 | 10/1992 |
| EP | 0663334 A1 | 7/1995 |
| EP | 0765802 A2 | 4/1997 |
| EP | 0765802 A3 | 4/1997 |
| EP | 0766017 A1 | 4/1997 |
| EP | 0898542 B1 | 5/1997 |
| EP | 0849153 B1 | 12/1997 |
| EP | 0834450 A1 | 4/1998 |
| EP | 0849154 A2 | 6/1998 |
| EP | 0849155 A2 | 6/1998 |
| EP | 0765802 B1 | 7/1999 |
| EP | 1043221 A2 | 10/2000 |
| EP | 1074462 A2 | 2/2001 |
| EP | 1270393 B1 | 1/2003 |
| EP | 1281609 B1 | 2/2003 |
| EP | 1378430 A1 | 1/2004 |
| EP | 1378433 A1 | 1/2004 |
| EP | 1407962 A1 | 4/2004 |
| EP | 1419961 A1 | 5/2004 |
| EP | 1422134 A2 | 5/2004 |
| EP | 1439117 A2 | 7/2004 |
| EP | 1439118 A2 | 7/2004 |
| EP | 1616781 A1 | 1/2006 |
| EP | 1688345 A2 | 8/2006 |
| EP | 1792821 A1 | 6/2007 |
| EP | 1818251 A1 | 8/2007 |
| EP | 1964769 A2 | 9/2008 |
| EP | 1964769 A3 | 9/2008 |
| EP | 1 995 166 A2 | 11/2008 |
| EP | 2022713 A2 | 2/2009 |
| EP | 2042422 A1 | 4/2009 |
| EP | 2045181 A1 | 4/2009 |
| EP | 2048075 A2 | 4/2009 |
| EP | 2165927 A1 | 3/2010 |
| EP | 1486413 B1 | 4/2010 |
| EP | 1818252 B1 | 9/2011 |
| EP | 1820726 B1 | 9/2011 |
| EP | 2311718 B1 | 10/2011 |
| EP | 2412620 A1 | 2/2012 |
| EP | 1669285 B1 | 4/2012 |
| EP | 2441656 A1 | 4/2012 |
| EP | 1486412 B1 | 5/2014 |
| EP | 1342657 B2 | 10/2014 |
| EP | 3 109 062 A1 | 12/2015 |
| FR | 1027817 | 5/1953 |
| FR | 1384356 | 2/1975 |
| FR | 2588236 | 10/1986 |
| FR | 2612870 | 3/1988 |
| FR | 2780698 | 1/2000 |
| GB | 1031337 | 6/1966 |
| GB | 1281731 | 7/1972 |
| GB | 1361394 | 7/1974 |
| GB | 1431308 | 4/1976 |
| GB | 2177628 A | 1/1987 |
| GB | 2225296 A | 5/1990 |
| GB | 2289507 A | 11/1995 |
| JP | 5412663 | 1/1979 |
| JP | 59165293 | 6/1984 |
| JP | 526785 | 4/1993 |
| JP | 1995-002157 | 1/1995 |
| JP | 10181669 A | 7/1998 |
| JP | 3196695 | 6/2001 |
| JP | 3248675 | 11/2001 |
| JP | 3108527 | 9/2005 |
| JP | 2007-223586 | 9/2007 |
| JP | 2008189254 A | 8/2008 |
| JP | 2009-12766 | 1/2009 |
| JP | 2011-93526 | 5/2011 |
| JP | 2012-171419 | 9/2012 |
| JP | 2017035926 A | 2/2017 |
| KR | 10-2011-0075299 | 7/2011 |
| KR | 10-2012-0111687 | 10/2012 |
| KR | 10-1346783 | 12/2013 |
| NL | 1015666 | 1/2001 |
| NL | 2005745 | 5/2012 |
| NZ | 598054 | 5/2013 |
| SK | 1032-95 | 2/1996 |
| SK | 280106 | 6/1999 |
| TW | 148114 | 6/1989 |
| TW | 161866 | 6/1989 |
| TW | 500679 | 1/1990 |
| TW | 198039 | 7/1990 |
| TW | 199380 | 10/1990 |
| TW | 548158 | 10/1990 |
| TW | 527254 | 5/1991 |
| TW | 200800717 | 6/1995 |
| TW | I288100 | 6/1995 |
| TW | M324029 | 3/1996 |
| TW | 200846243 | 5/1996 |
| TW | I363725 | 5/1996 |
| TW | 284731 | 9/1996 |
| TW | 337531 | 11/1996 |
| TW | 200922834 | 11/1996 |
| TW | 200932621 | 8/1998 |
| TW | 264208 | 5/2005 |
| TW | I275525 | 12/2005 |
| TW | 201026555 A1 | 7/2010 |
| TW | 201029769 A1 | 8/2010 |
| TW | M386236 | 8/2010 |
| TW | I351327 B1 | 11/2011 |
| TW | 201204597 A1 | 2/2012 |
| TW | 201242833 A | 11/2012 |
| TW | M458370 U1 | 8/2013 |
| TW | I411554 B | 10/2013 |
| TW | I411555 B | 10/2013 |
| TW | 201422482 A | 6/2014 |
| TW | M576558 U | 4/2019 |
| TW | I708709 B | 11/2020 |
| TW | M605175 U | 12/2020 |
| WO | 89/08039 | 8/1989 |
| WO | 96/03306 | 2/1996 |
| WO | 99/54193 | 10/1999 |
| WO | 01/72578 A1 | 10/2001 |
| WO | 02/32751 A2 | 4/2002 |
| WO | 03/000543 A1 | 1/2003 |
| WO | 2004/080786 A2 | 9/2004 |
| WO | 2004/094218 A2 | 11/2004 |

(56) References Cited

FOREIGN PATENT DOCUMENTS

| WO | 2012/065256 | A1 | 5/2012 |
|---|---|---|---|
| WO | 2012/069389 | A1 | 5/2012 |
| WO | 2017/040047 | A1 | 3/2017 |
| WO | 2017040047 | A1 | 3/2017 |
| WO | 2017165226 | A1 | 9/2017 |
| WO | 2019040340 | A1 | 2/2019 |
| WO | 2022015790 | A1 | 1/2022 |

OTHER PUBLICATIONS

Machine translation of DE 19751879 obtained on Dec. 6, 2018.
International Preliminary Report on Patentability from PCT Application No. PCT/US2017/023016.
International Search Report and Written Opinion from International Application No. PCT/US18/46952 dated Nov. 9, 2018.
The European Search Report dated Apr. 1, 2019 for European Application No. 16842566.8.
The Taiwanese Office Action dated Jun. 29, 2020 for the Taiwan Patent Application No. 105126399.
The Taiwanese Examination Notification dated Jul. 31, 2020 for the Taiwan Patent Application No. 106109159.
The International Preliminary Report for the PCT Application No. PCT/US2018/046952 dated Mar. 5, 2020.
A copy of the Chinese Office Action dated Apr. 29, 2020 for the Chinese Patent Application No. 2016800500067.
The Taiwan Office Action for Taiwanese Patent Application No. 105126339 dated Jan. 9, 2020.
The Chinese Office Action for the Chinese Patent Application No. 201780017990.01 dated Feb. 3, 2020.
The European Office Action dated Mar. 5, 2020 for the European Patent Application No. 16 842 566.8.
The Second Office Action dated Sep. 14, 2020 for the Taiwan Patent Application No. 201780017990.1.
The Chinese Notice of Examination dated Mar. 1, 2021 from the Chinese Patent Application No. 201880064395.8.
The European Search Report dated Mar. 16, 2021 for the European Patent Application No. EP 18 84 8212.
The Chinese Office Action dated Mar. 30, 2021 for the Chinese Application :201780017990.01.
The Notice to Grant dated Feb. 19, 2021 from the Chinese Patent Application No. 201680050006.7.
The Official Letter dated Dec. 1, 2020 from the European Patent Application No. 16842533.8.
The Official Letter dated Jul. 28, 2021 from the Chinese Patent Application No. 201780017990.1.
The Third Party Observation dated Oct. 5, 2021 from the Taiwanese Patent Application No. 109133450.
The Second Office Action dated Oct. 22, 2021 from the Chinese Patent Application No. 201880064395.8.
Mountain Cycle Catalog 2000, www.MountainCycle.com.
Mountain Bike Action Magazine, Oct. 2000, pp. 38-40, www.mbaction.com.
Mountain Bike Action Magazine 2000, p. 138, www.mbaction.com.
2001 Gizmo Installation Instructions, web.archive.org/web/20011025172447/http7/mrdirt.com/gizmo/page4.htm.
2006 Race Face Interbike(Trade Show)Booth, www.bikemagic.com.
Decline Magazine, Issue 20, Article "Its the New Style", Jan. Feb. 2006.
Copy of International Search Report from PCT/US2017/023016.
The Official Letter dated Jul. 5, 2021 from the Taiwanese Patent Application No. 109133450.
The Notice of Allowance dated Nov. 15, 2021 from the Chinese Patent Application No. 201780017990.1.
International Search Report with Written Opinion dated Nov. 10, 2021, from the PCT Patent Application No. PCT/US2021/041529.
Office action from the Taiwan Application No. 109133450 dated Jan. 5, 2022.

* cited by examiner

BICYCLE CASSETTE WITH CLAMPING CONNECTION

RELATED APPLICATIONS

This Patent Application claims priority under 35 U.S.C. 119(e) of the U.S. provisional patent application, Application No. 62/548,210, filed on Aug. 21, 2017, and entitled "BICYCLE CASSETTE WITH CLAMPING CONNECTION," which is also hereby incorporated by reference in its entirety.

FIELD OF THE INVENTION

The present invention is generally directed to bicycle sprockets and cassette assemblies. More specifically, the present invention is directed to a multi-piece bicycle cassette with a clamping connection for connecting the bicycle cassette to a bicycle hub driver body

BACKGROUND OF THE INVENTION

On a bicycle, the cassette comprises a series of sprockets which attach to a hub driver of the rear wheel. The cassette comprises a series of appropriately sized sprockets which are typically chosen for a specific riding style and/or a riding location. For example, a cassette with a series of smaller sprockets is useful for fast riding and in a flatter location, while a cassette with a series of larger sprockets can be useful for climbing and in a hilly location. The cassette with the desired number and size of sprockets is typically attached to the hub driver body using a locking ring for securing the whole cassette to the hub.

SUMMARY OF THE INVENTION

A bicycle cassette comprises a clampstyle connection for connecting the bicycle cassette to a bicycle hub driver body. The bicycle cassette is attached to a bicycle hub driver body by incorporating a clamp structure into one portion of the cassette, which then rigidly clamps onto the driver body of the bicycle hub. In addition, when combined with a bayonet style attachment structure between two parts of the cassette, it allows for the use of a smaller sprocket on one segment of the cassette. Specifically, it allows a small 9 or 10 tooth sprocket to overhang the cassette driver body on a bicycle hub, by attaching the small cog assembly to a larger cog assembly using a bayonet style attachment.

In a first aspect, a bicycle cassette comprises a large sprocket sub-assembly comprising a clamping mechanism for attaching the large sprocket sub-assembly to a rear bicycle hub and a small sprocket sub-assembly, wherein the small sprocket sub-assembly rotatably couples with and locks to the large sprocket sub-assembly after the large sprocket assembly is clamped to the rear bicycle hub to form the bicycle cassette. In some embodiments, the large sprocket sub-assembly clamps to the rear bicycle hub by tightening a clamp screw. In some embodiments, the small sprocket sub-assembly is coupled to the large sprocket assembly using a locking bayonet style attachment. In some embodiments, the small sprocket sub-assembly comprises a 9 tooth sprocket. In further embodiments, the small sprocket sub-assembly comprises a 10 tooth sprocket. In some embodiments, the large sprocket sub-assembly comprises a 42 tooth sprocket. In further embodiments, the large sprocket sub-assembly comprises a 46 tooth sprocket. In still further embodiments, the large sprocket sub-assembly comprises a 50 tooth sprocket. In some embodiments, the large sprocket sub-assembly comprises a sprocket with more than 50 teeth. In some embodiments, the large sprocket sub-assembly and the small sprocket assembly are manufactured from different materials. In some embodiments, the small sprocket sub-assembly overhangs a cassette driver body of the bicycle hub in an assembled configuration. In some embodiments, the small sprocket sub-assembly comprises a bushing, which radially supports said small sprocket sub-assembly on the cassette driver body of the bicycle hub in the assembled configuration.

In another aspect, a bicycle cassette and hub system comprises a rear bicycle hub, a hub driver assembly coupled to the rear bicycle hub and a cassette assembly clamped to the hub driver assembly, the cassette assembly comprising a large sprocket sub-assembly comprising a clamping mechanism for clamping the large sprocket sub-assembly to the hub driver assembly and a small sprocket sub-assembly, wherein the small sprocket sub-assembly rotatably couples with and locks to the large sprocket sub-assembly after the large sprocket assembly is clamped to the rear bicycle hub to form the bicycle cassette assembly. In some embodiments, the large sprocket sub-assembly clamps to the hub driver assembly by tightening a clamp screw. In some embodiments, the small sprocket sub-assembly is coupled to the large sprocket sub-assembly using a locking bayonet style attachment. In some embodiments, the small sprocket sub-assembly comprises a 9 tooth sprocket. In further embodiments, the small sprocket sub-assembly comprises a 10 tooth sprocket. In some embodiments, the large sprocket sub-assembly comprises a 42 tooth sprocket. In further embodiments, the large sprocket sub-assembly comprises a 46 tooth sprocket. In still further embodiments, the large sprocket sub-assembly comprises a 50 tooth sprocket. In some embodiments, the large sprocket sub-assembly comprises a sprocket with more than 50 teeth. In some embodiments, the large sprocket assembly and the small sprocket assembly are manufactured from different materials. In some embodiments, the small sprocket sub-assembly overhangs the hub driver assembly in an assembled configuration. In some embodiments, the small sprocket sub-assembly comprises a bushing, which radially supports said small sprocket sub-assembly on the cassette driver body of the bicycle hub in the assembled configuration.

In a further aspect, a method of attaching a bicycle cassette to a hub comprises sliding a large sprocket sub-assembly onto a hub driver body to engage the large sprocket assembly to the hub, clamping the large sprocket sub-assembly onto the hub by tightening a clamp screw of the large sprocket sub-assembly, sliding a small sprocket sub-assembly onto the hub driver body and attaching the small sprocket sub-assembly to the large sprocket assembly to form the bicycle cassette. In some embodiments, the small sprocket sub-assembly rotatably couples with and locks to the large sprocket assembly to form the bicycle cassette. In some embodiments, the small sprocket sub-assembly couples to the large sprocket sub-assembly using a locking bayonet style attachment.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the invention are directed to a bicycle cassette comprising a clampstyle connection for connecting the bicycle cassette to a bicycle hub driver body. The bicycle cassette is attached to a bicycle hub driver body by incorporating a clamp structure into one portion of the cassette, which then rigidly clamps onto the driver body of the bicycle hub. In addition, when combined with a bayonet style attachment structure between two parts of the cassette, it allows for the use of a smaller sprocket on one segment of the cassette. Specifically, it allows a small 9 or 10 tooth sprocket to overhang the cassette driver body on a bicycle hub, by attaching the small cog assembly to a larger cog assembly using a bayonet style attachment.

Reference will now be made in detail to implementations of a bicycle cassette with a clamping connection as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
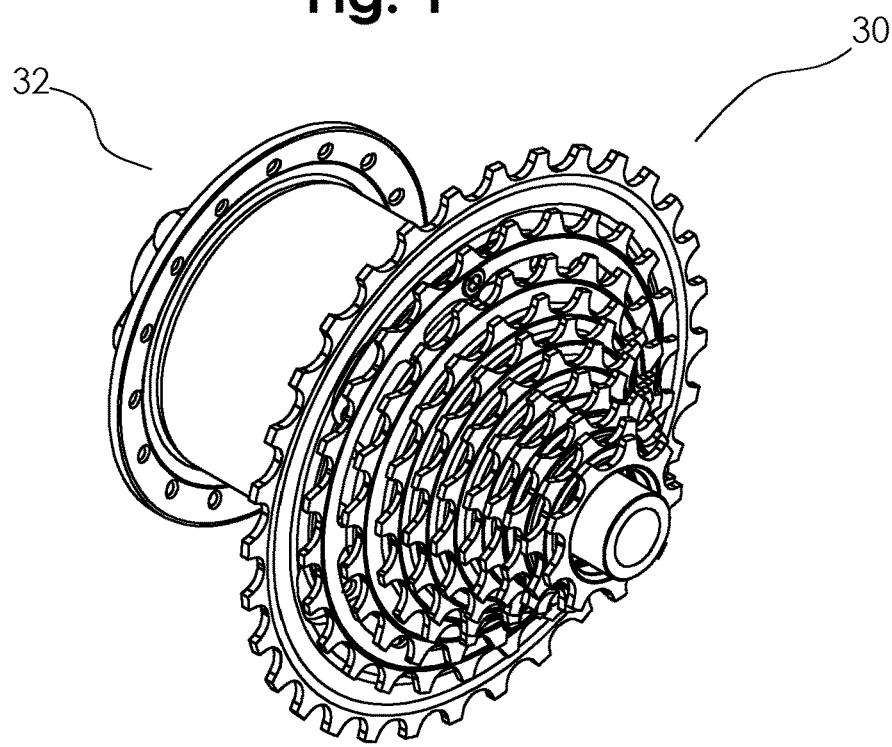
FIG. 1 illustrates an isometric right view of a complete cassette assembly mounted to a rear bicycle hub, in accordance with some embodiments.
Figure 2:
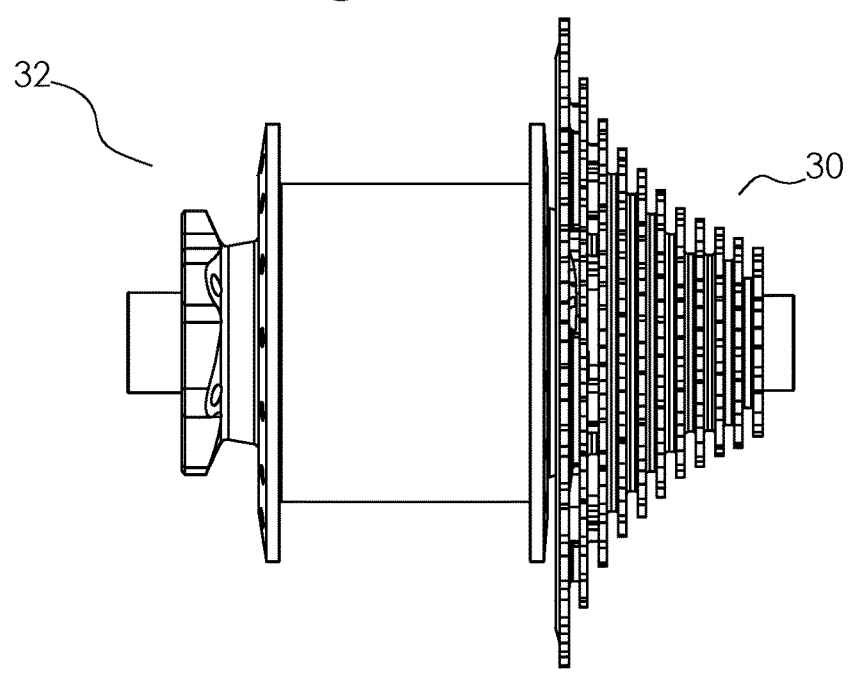
FIG. 2 illustrates a top view of a complete cassette assembly mounted to a rear bicycle hub, in accordance with some embodiments.

Referring now to FIGS. 1 and 2, a complete cassette assembly 30 is depicted therein. The complete cassette assembly is installed on the right side of a rear bicycle hub 32.

Figure 3:
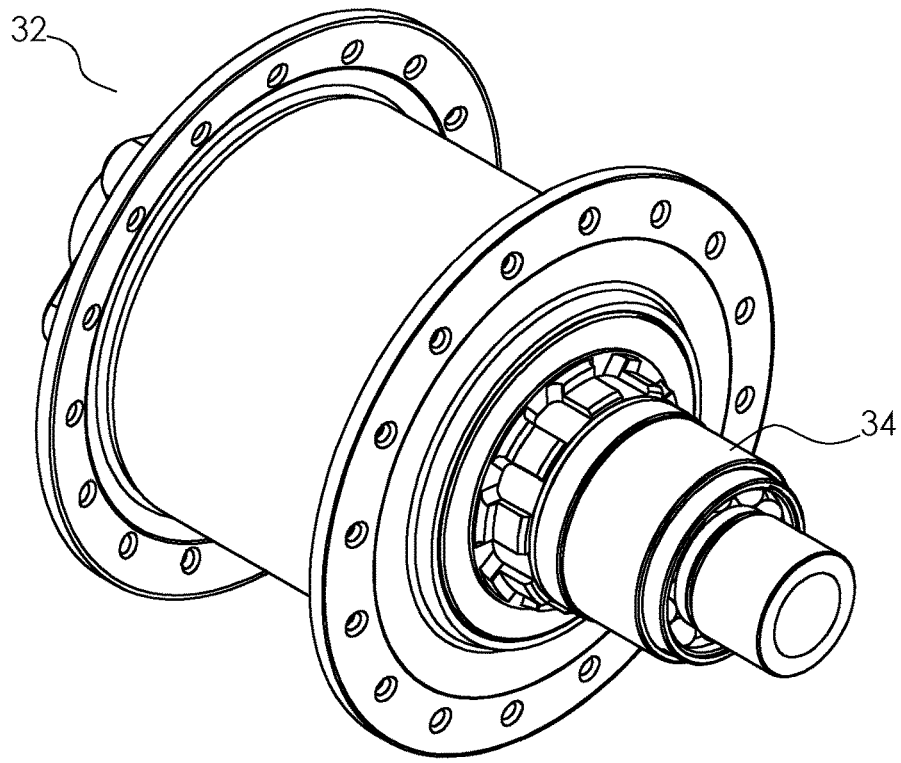
FIG. 3 illustrates an isometric right view of a rear bicycle hub, in accordance with some embodiments.

FIG. 3 shows the rear bicycle hub 32 prior to installation of the complete cassette assembly 30, including the hub driver assembly 34.

Figure 4:
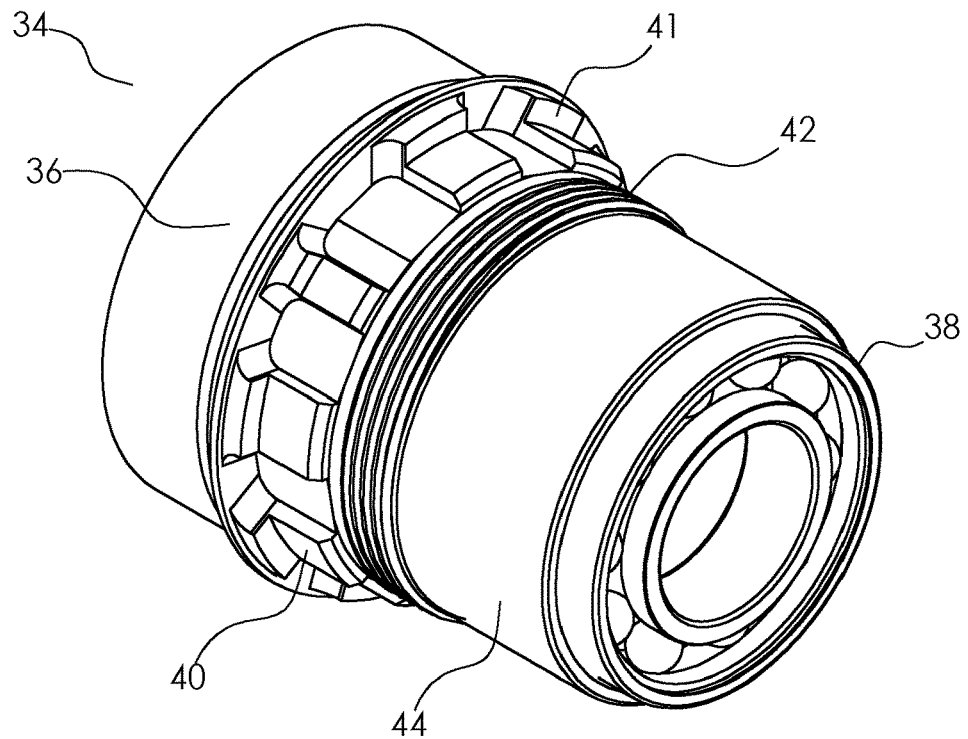
FIG. 4 illustrates an isometric right view of a hub driver assembly, in accordance with some embodiments.

As shown within FIG. 4, the hub driver assembly 34 includes a hub driver body 36, an outboard hub driver bearing 38, a hub driver torque coupling 40, a hub driver cassette stop face 41, a hub driver thread 42 and a hub driver right-end radial surface 44.

Figure 5:
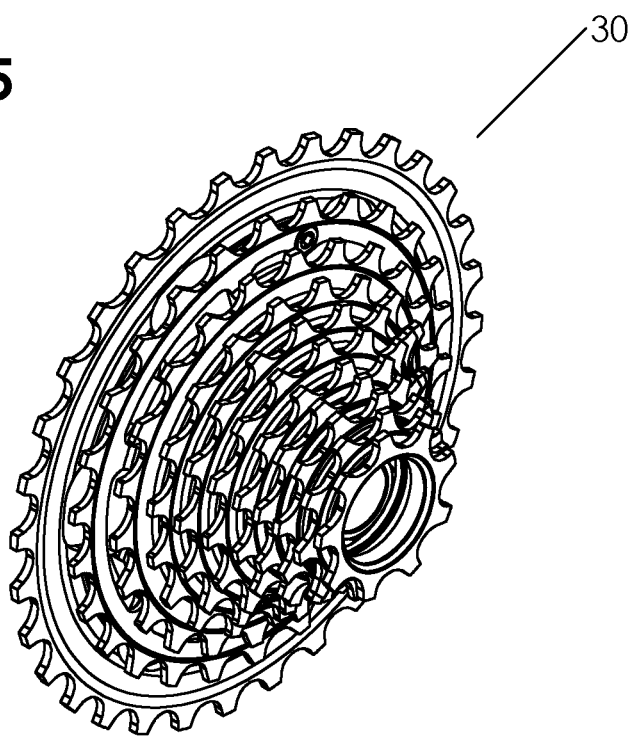
FIG. 5 illustrates an isometric right view of a complete cassette assembly mounted to a hub driver, in accordance with some embodiments.
Figure 6:
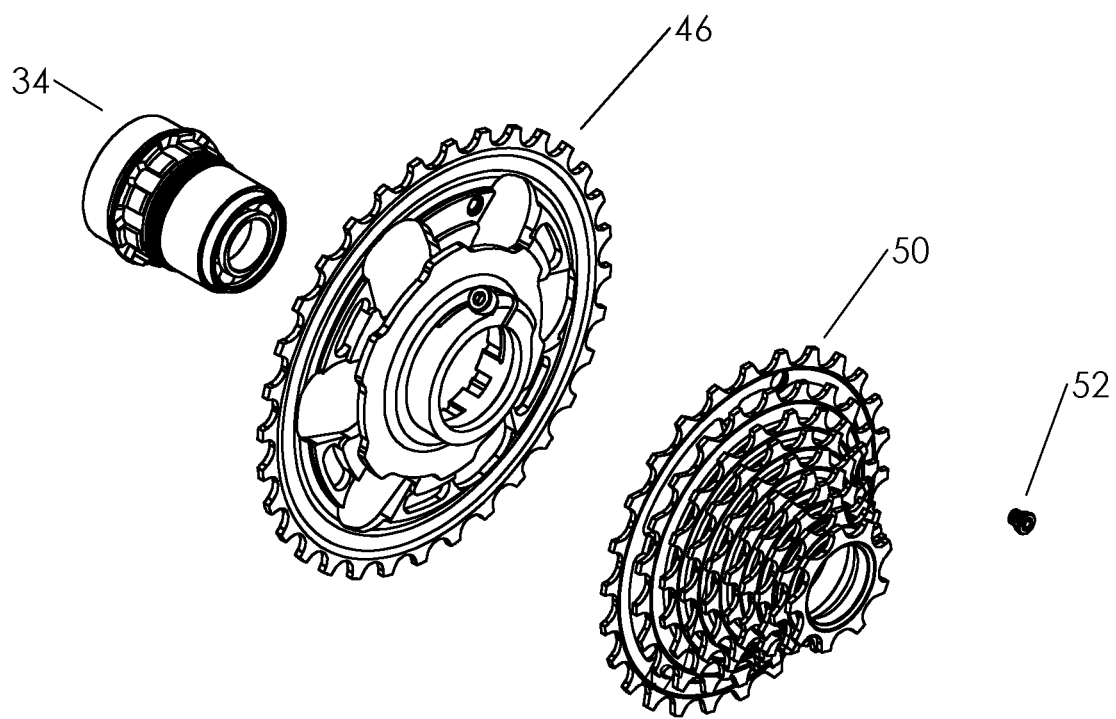
FIG. 6 illustrates an exploded view of a complete cassette assembly mounted to a hub driver, in accordance with some embodiments.

As shown within FIGS. 5 and 6, a complete cassette assembly 30 includes a cassette large sprocket sub-assembly 46, a cassette small sprocket sub-assembly 50, and a cassette locking screw 52.

Figure 7:
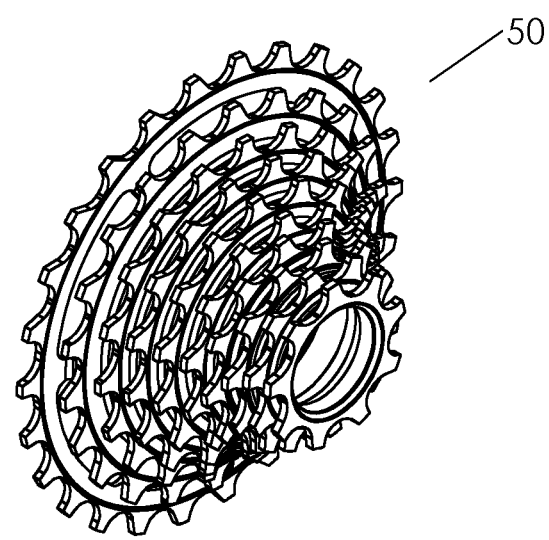
FIG. 7 illustrates an isometric right view of a cassette small sprocket sub-assembly, in accordance with some embodiments.
Figure 8:
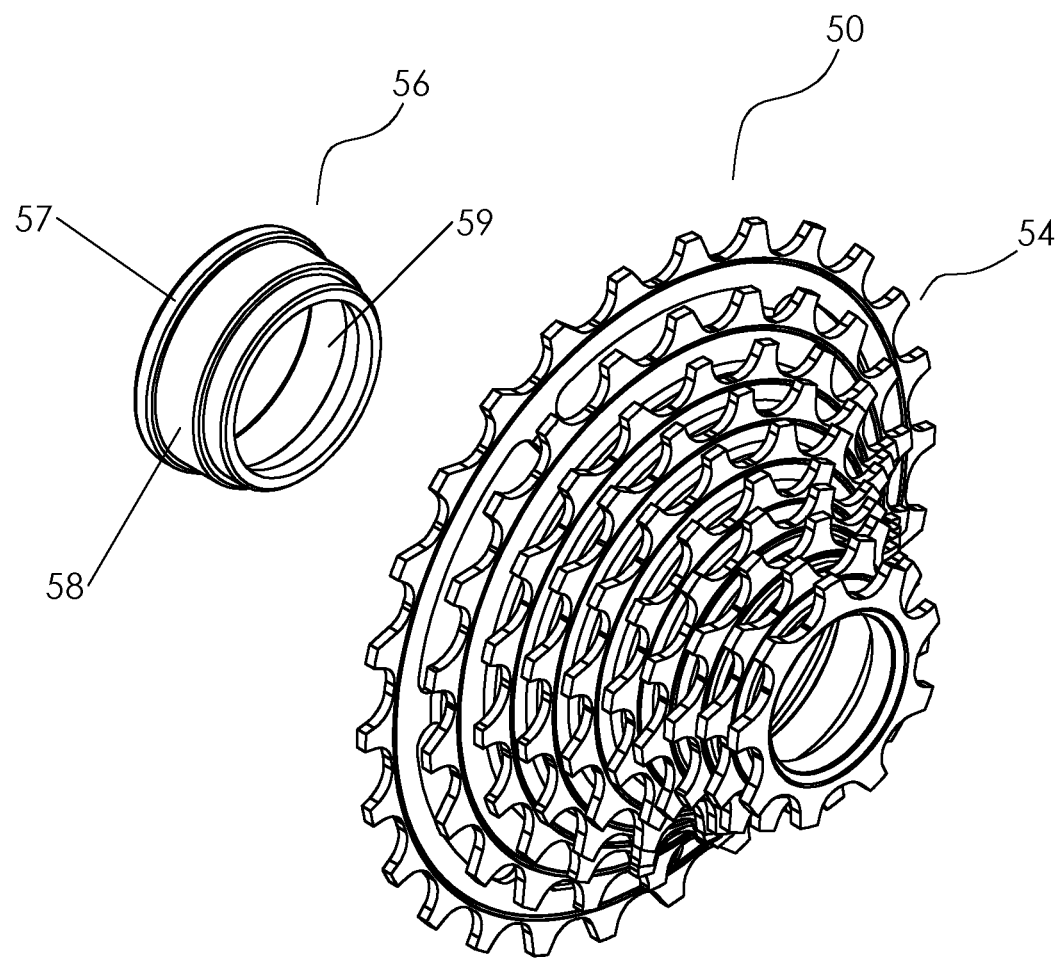
FIG. 8 illustrates an exploded view of a cassette small sprocket sub-assembly, in accordance with some embodiments.

As shown within FIGS. 7 and 8, a cassette small sprocket sub-assembly 50 includes a cassette small sprocket portion 54 and a cassette small sprocket bushing 56. The cassette small sprocket bushing 56 includes a bushing flange 57, a bushing outer stepped surface 58 and a bushing inner stepped surface 59.

Figure 9:
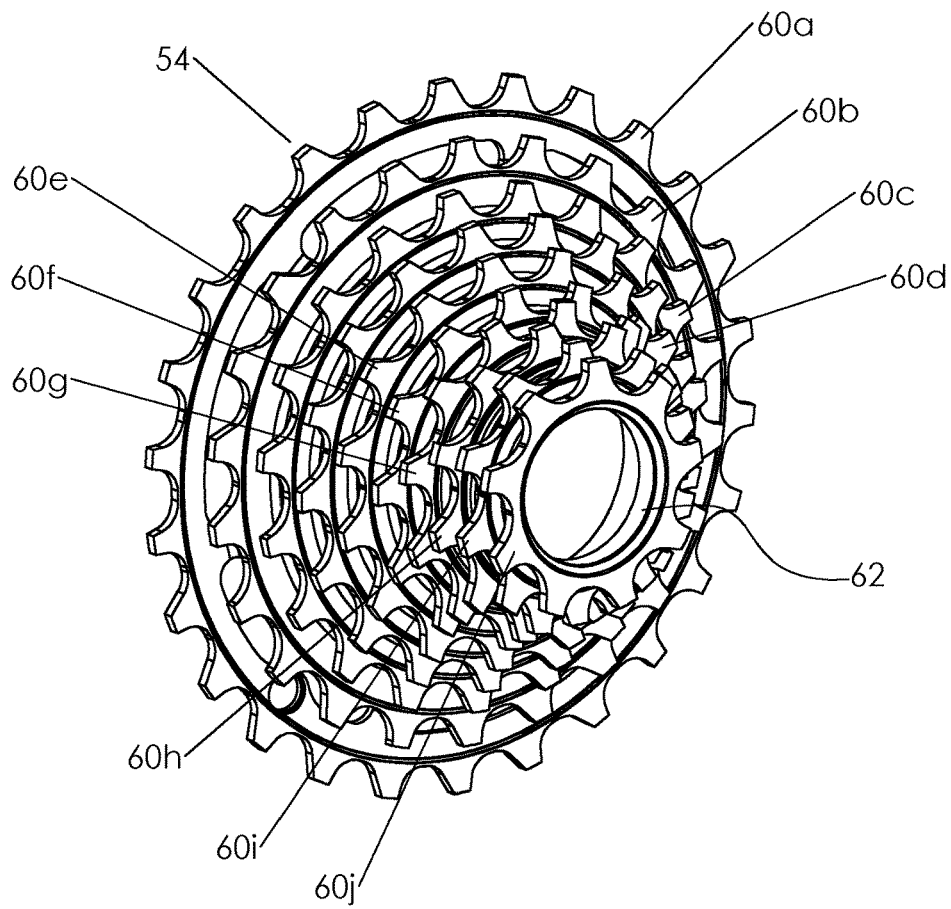
FIG. 9 illustrates an isometric right view of a cassette small sprocket piece, in accordance with some embodiments.

FIG. 9 shows a cassette small sprocket portion 54. The small sprocket portion 54 includes 10 small portion sprockets 60a, 60b, 60c, 60d, 60e, 60f, 60g, 60h, 60i, and 60j, and a small sprocket portion axle clearance hole 62.

Figure 10:
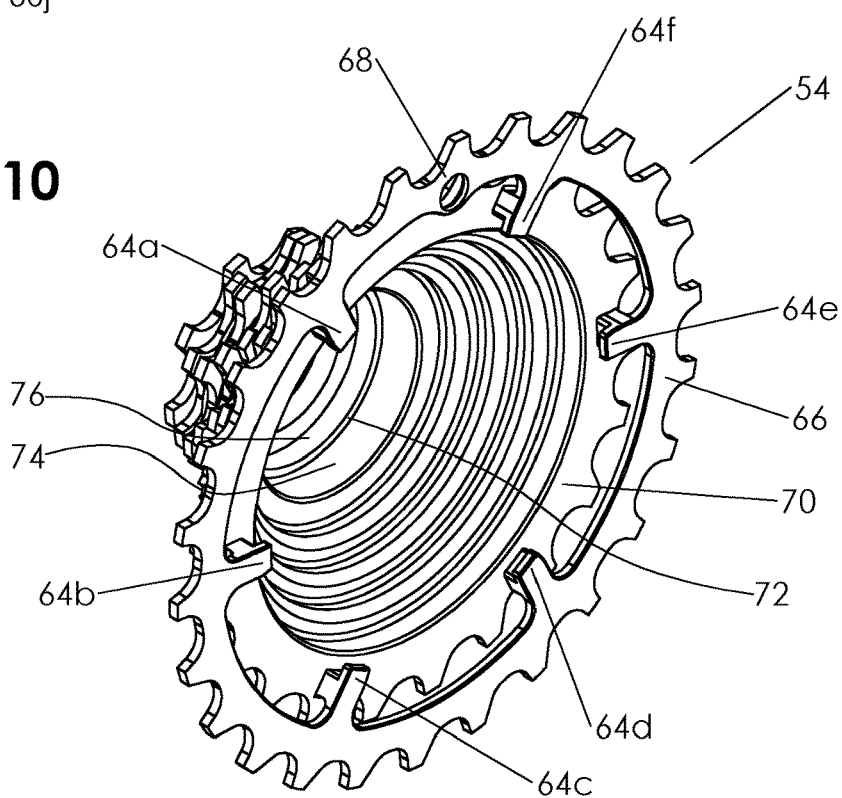
FIG. 10 illustrates an isometric left view of a cassette small sprocket piece, in accordance with some embodiments.

FIG. 10 shows a cassette small sprocket portion 54, which includes locking tangs 64a, 64b, 64c, 64d, 64e, 64f, and a small sprocket portion locking hole 68. The small sprocket portion 54 also includes a first small sprocket portion axial locating face 70, a second small sprocket portion axial locating face 72, a first small sprocket portion locating bore 74 and a second small sprocket portion locating bore 76, and a small sprocket portion large end face 66.

Figure 11:
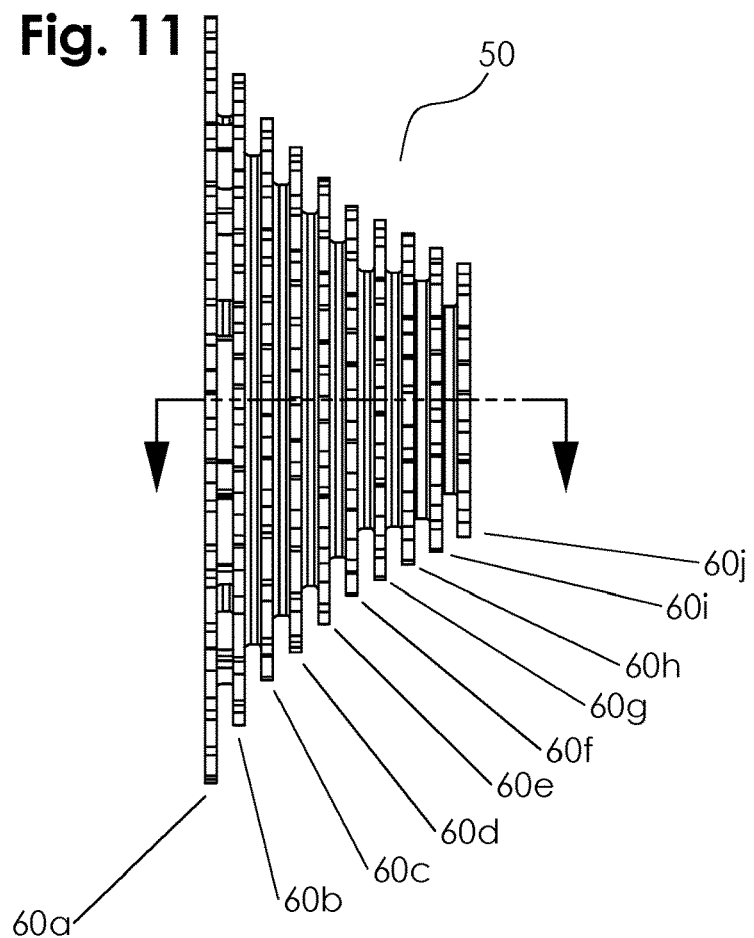
FIG. 11 illustrates a top view of a cassette small sprocket sub-assembly, in accordance with some embodiments.

FIG. 11 shows a right side view of the cassette small sprocket sub-assembly 50, including said small portion sprockets 60a, 60b, 60c, 60d, 60e, 60f, 60g, 60h, 60i, and 60j.

Figure 12:
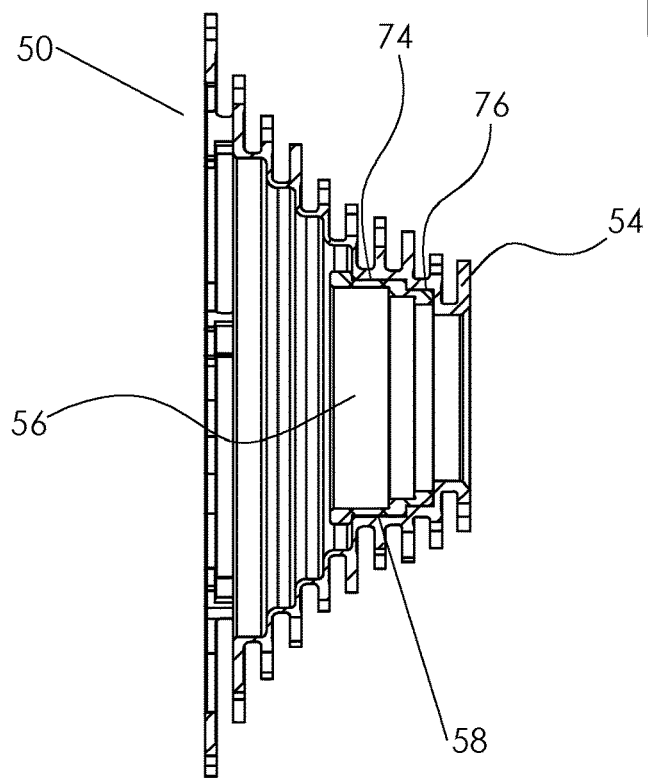
FIG. 12 illustrates a section view of a cassette small sprocket sub-assembly, in accordance with some embodiments.

FIG. 12 shows a cross section of the cassette small sprocket sub-assembly 50. The cassette small sprocket bushing 56 is assembled into the cassette small sprocket portion 54 such that the cassette outer stepped surface 58 fits inside the first small sprocket portion locating bore 74 and the second small sprocket portion locating bore 76.

Figure 13:
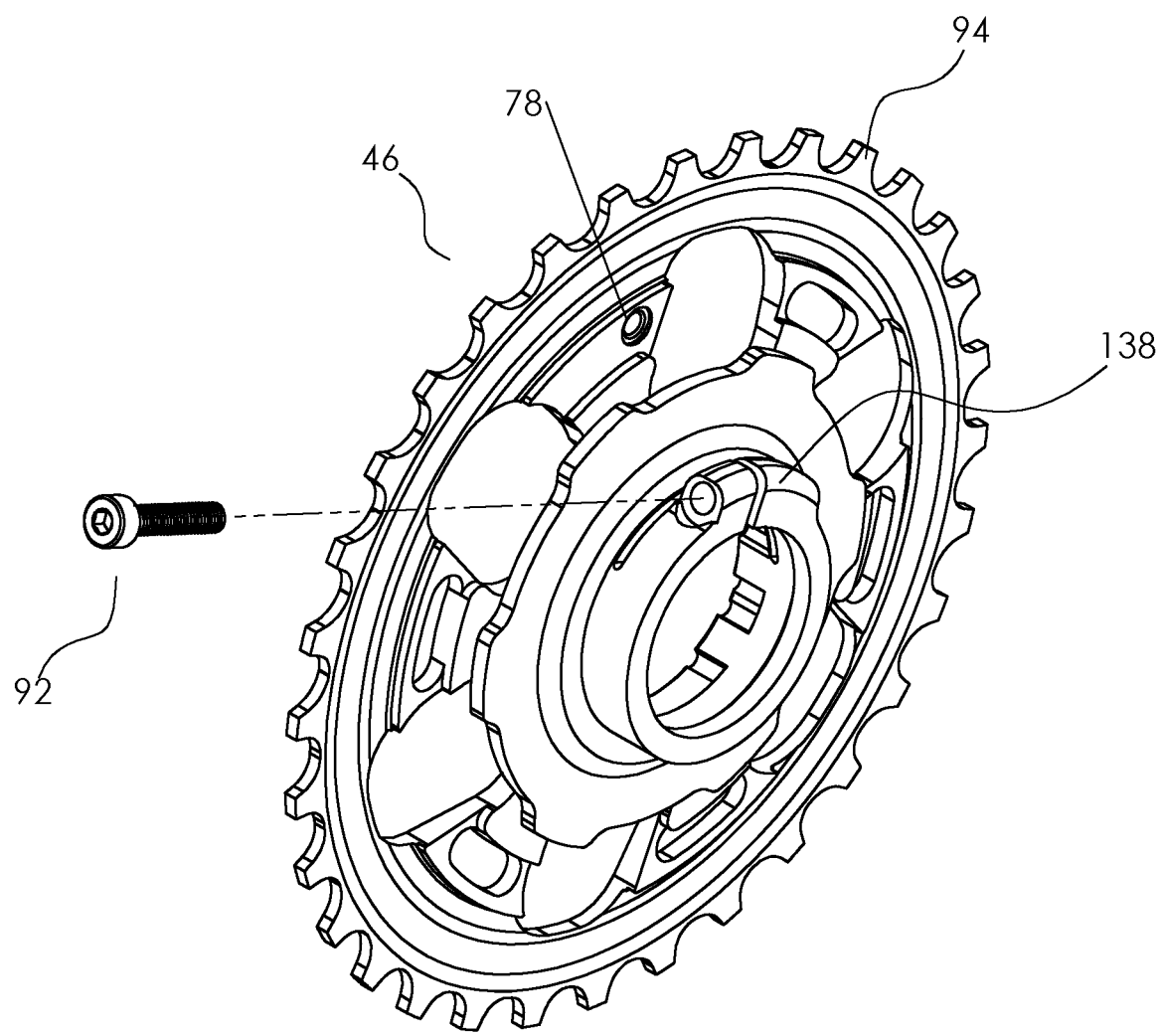
FIG. 13 illustrates an exploded view of a cassette large sprocket sub-assembly, in accordance with some embodiments.

FIG. 13 shows an exploded view of the cassette large sprocket sub-assembly 46, which includes the large sprocket portion 90 and the large sprocket clamp screw 92. FIG. 13 also shows a large portion clamp 138.

Figure 14:
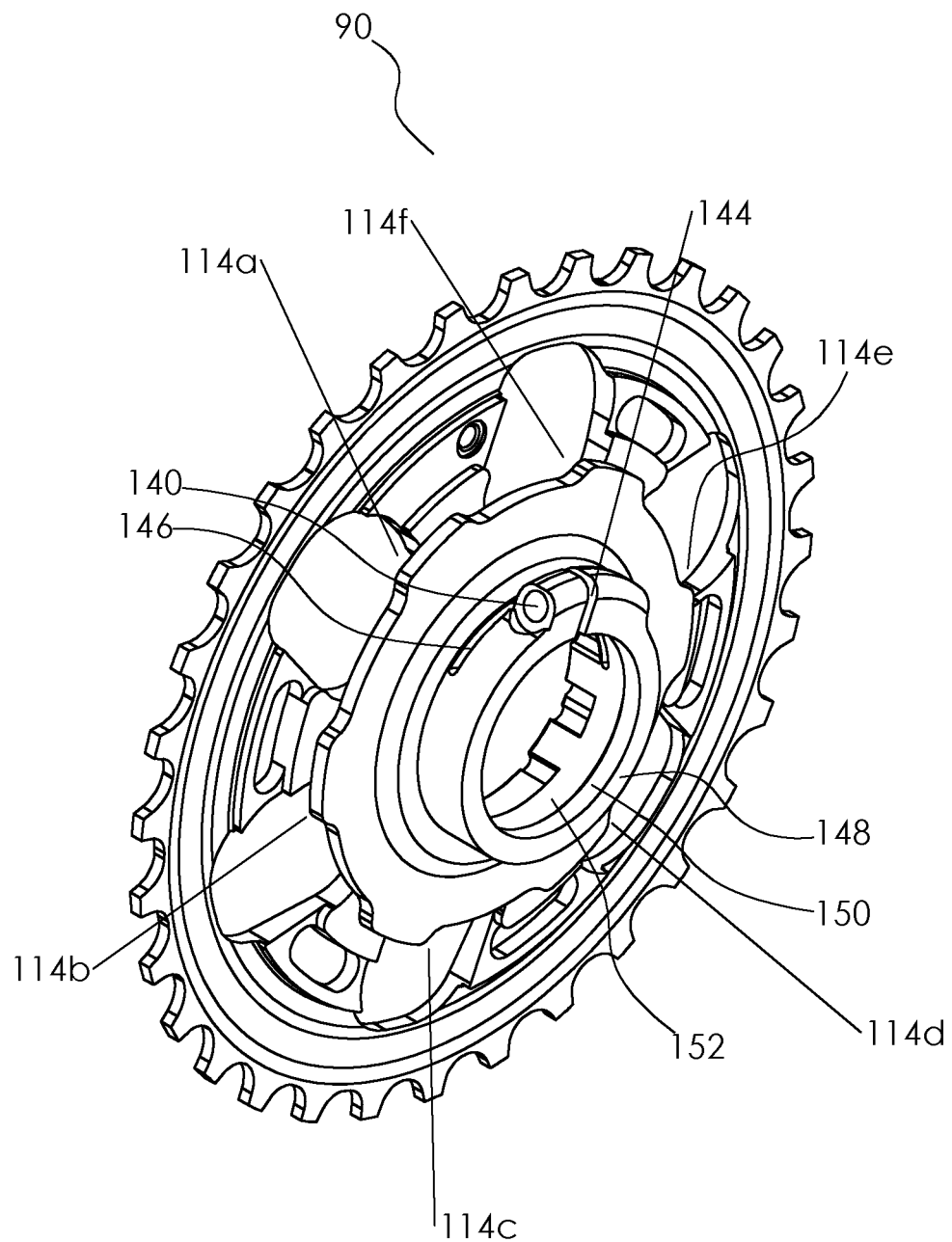
FIG. 14 illustrates an isometric right view of a cassette large sprocket portion, in accordance with some embodiments.

FIG. 14 shows a right side isometric view of the cassette large sprocket portion 90, including the clamp screw clearance hole 140, clamp flexure slot 146, and clamp clearance slot 144. It also shows the clamp boss end face 148 and clamp contact surface 150, and the locking flanges 114a, 114b, 114c, 114d, 114e, and 114f.

Figure 15:
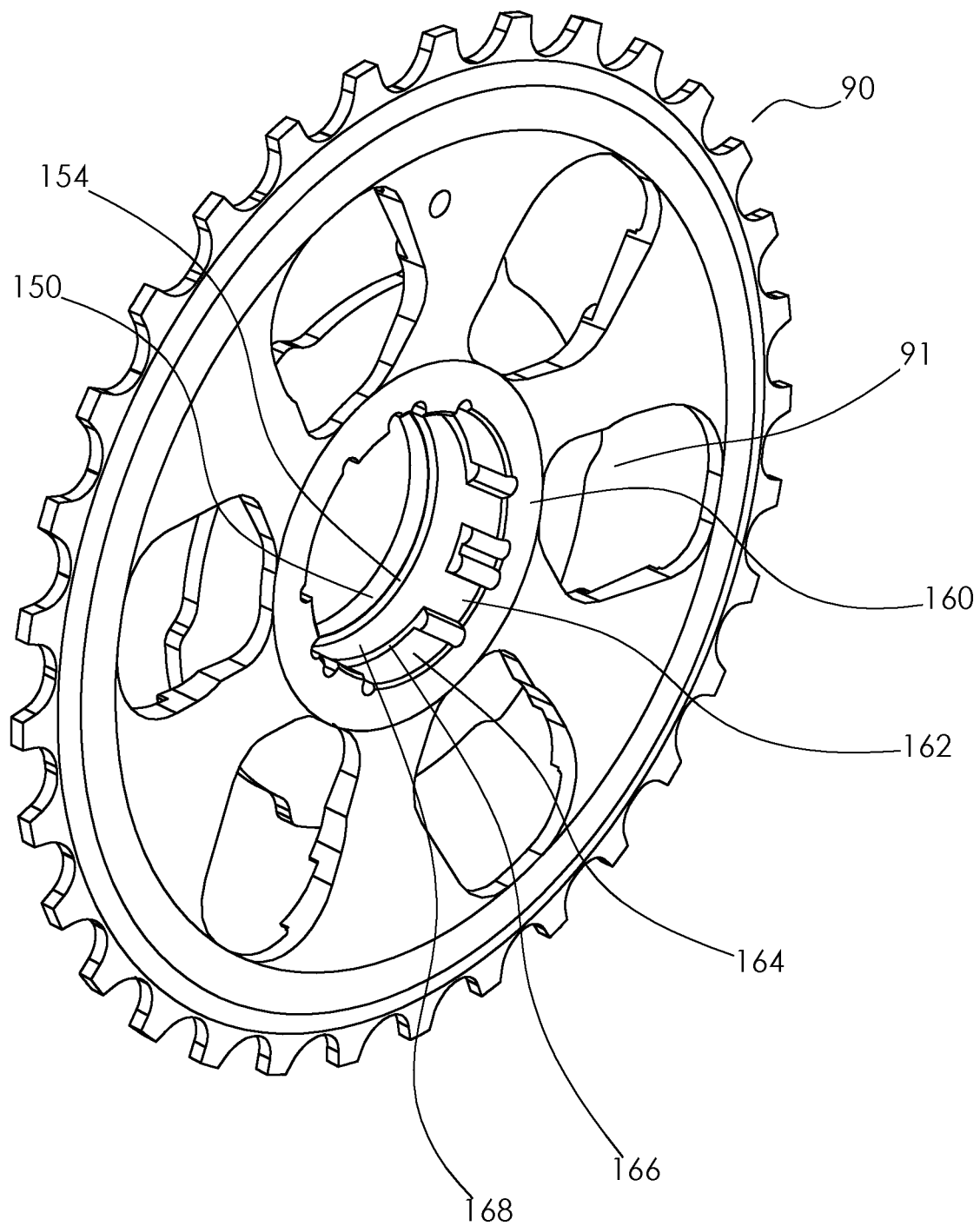
FIG. 15 illustrates an isometric left view of a cassette large sprocket portion, in accordance with some embodiments.

FIG. 15 shows a rear view of the large sprocket portion 90 and the large sprocket driver torque coupling 91. The large sprocket driver torque coupling 91 is comprised of a driver torque coupling stop face 160, a torque coupling spline tooth 162, a torque coupling spline recess 164, and a torque coupling spline end face 166. The large sprocket portion 90 also includes a driver thread clearance bore and a clamp inner end face 154 and the clamp contact surface 150.

Figure 16:
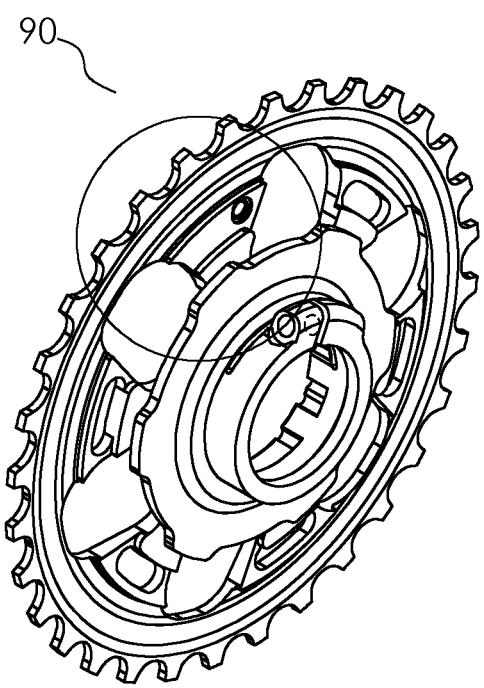
FIG. 16 illustrates an isometric right view of a cassette large sprocket portion, in accordance with some embodiments.
Figure 17:
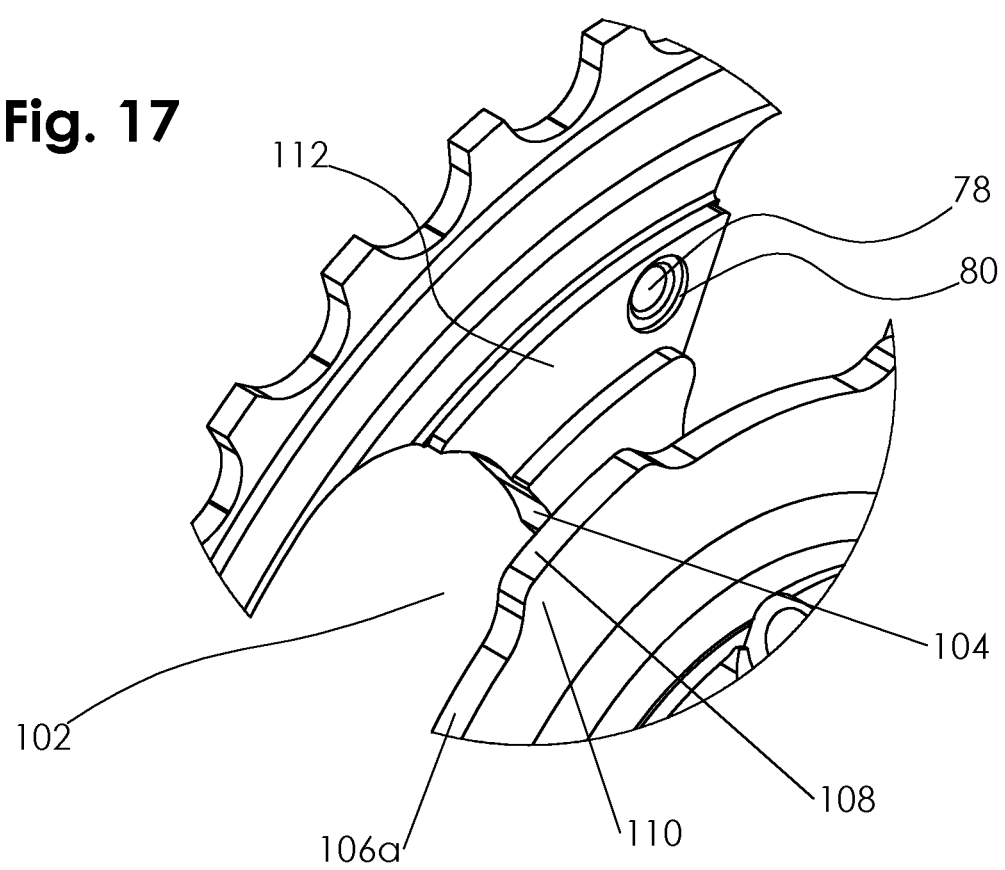
FIG. 17 illustrates a detail view of a cassette large sprocket portion, in accordance with some embodiments.

FIGS. 16 and 17 illustrate the large sprocket portion 90 and the large sprocket cassette torque coupling 102. The large sprocket cassette torque coupling 102 includes a repeated patterned torque receiving face 104, a repeated patterned locking flange cutout 106, a repeated patterned locking flange radial surface 108, a repeated patterned locking flange inside surface 110, and a repeated patterned large sprocket portion offset boss 112.

Figure 18:
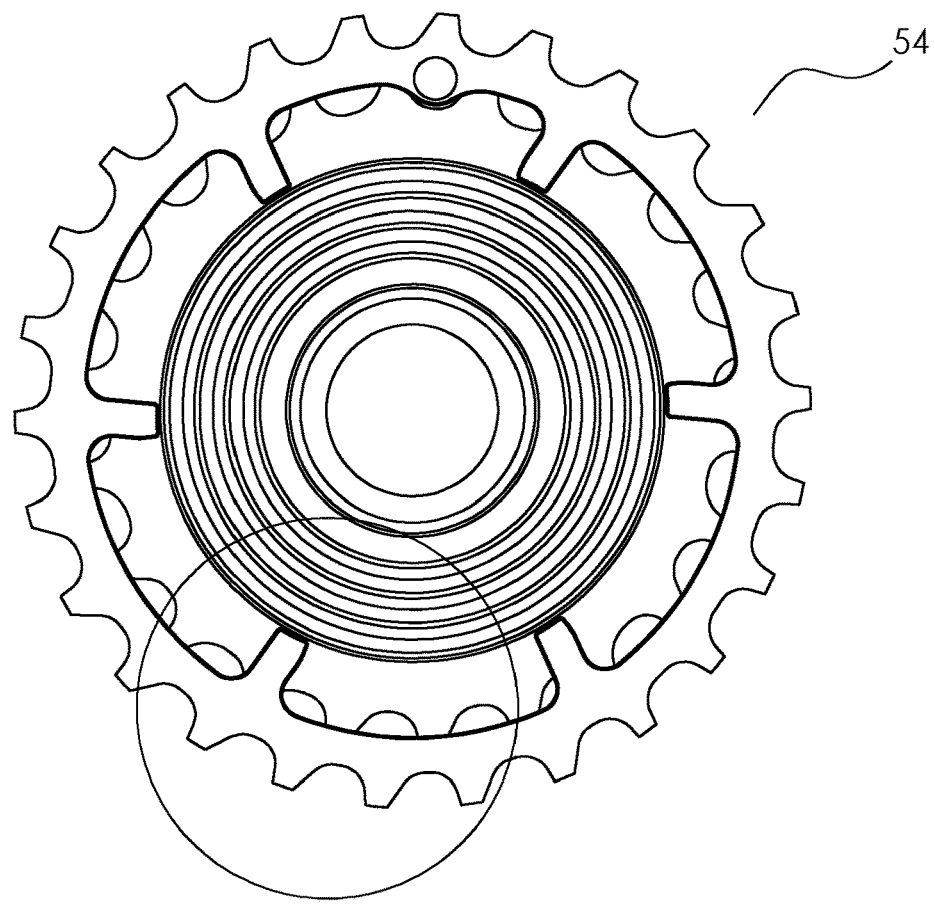
FIG. 18 illustrates a left side view of a cassette small sprocket portion, in accordance with some embodiments.
Figure 19:
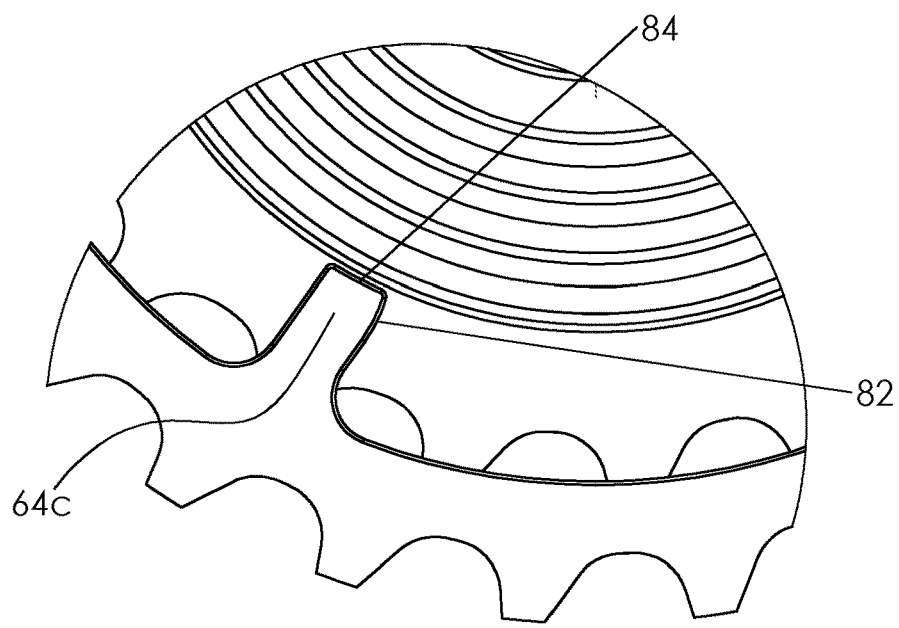
FIG. 19 illustrates a left side detail view of a cassette small sprocket portion, in accordance with some embodiments.

FIGS. 18 and 19 illustrate the cassette small sprocket portion 54, including a detail view of a locking tang 64c, which comprises a torque driving face 82 and a tang inside surface 84.

Figure 20:
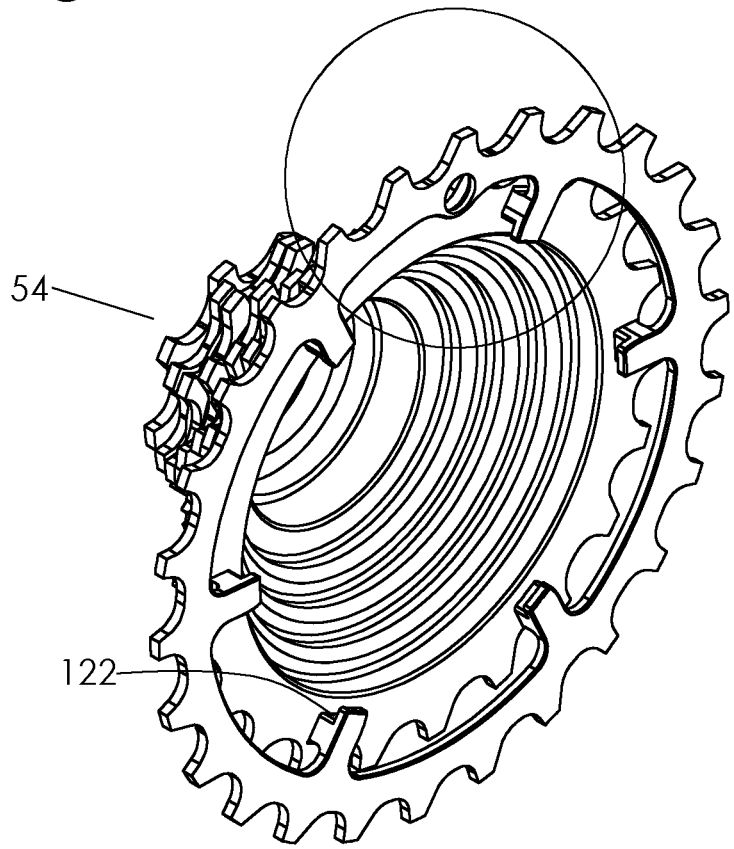
FIG. 20 illustrates a left side isometric view of a cassette small sprocket portion, in accordance with some embodiments.
Figure 21:
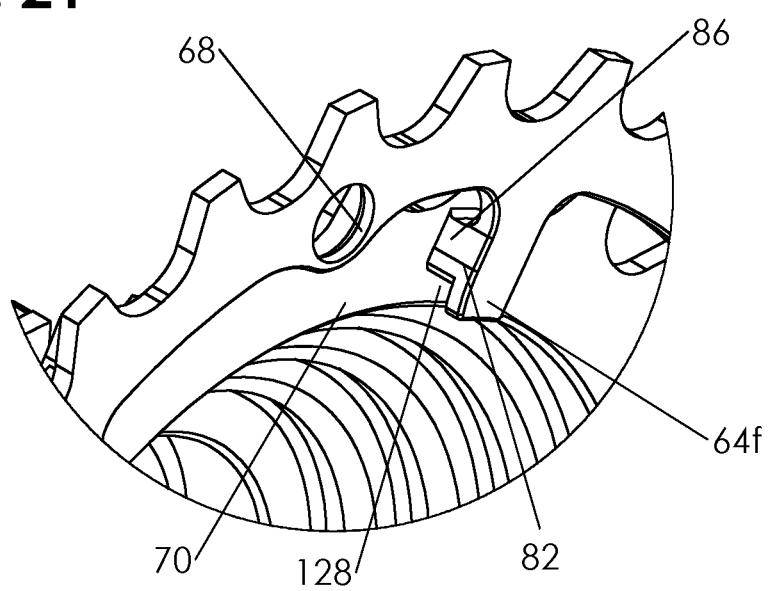
FIG. 21 illustrates a left side isometric detail view of a cassette small sprocket portion, in accordance with some embodiments.

FIGS. 20 and 21 illustrate the cassette small sprocket portion 54, showing the surface defining the locking tang radial clearance 122. FIG. 21 shows a torque driving face 82 and an isometric view of a locking tang standoff 86. FIG. 21 also shows another view of the locking tang 64f, and the locking tang axial clearance 128.

Figure 22:
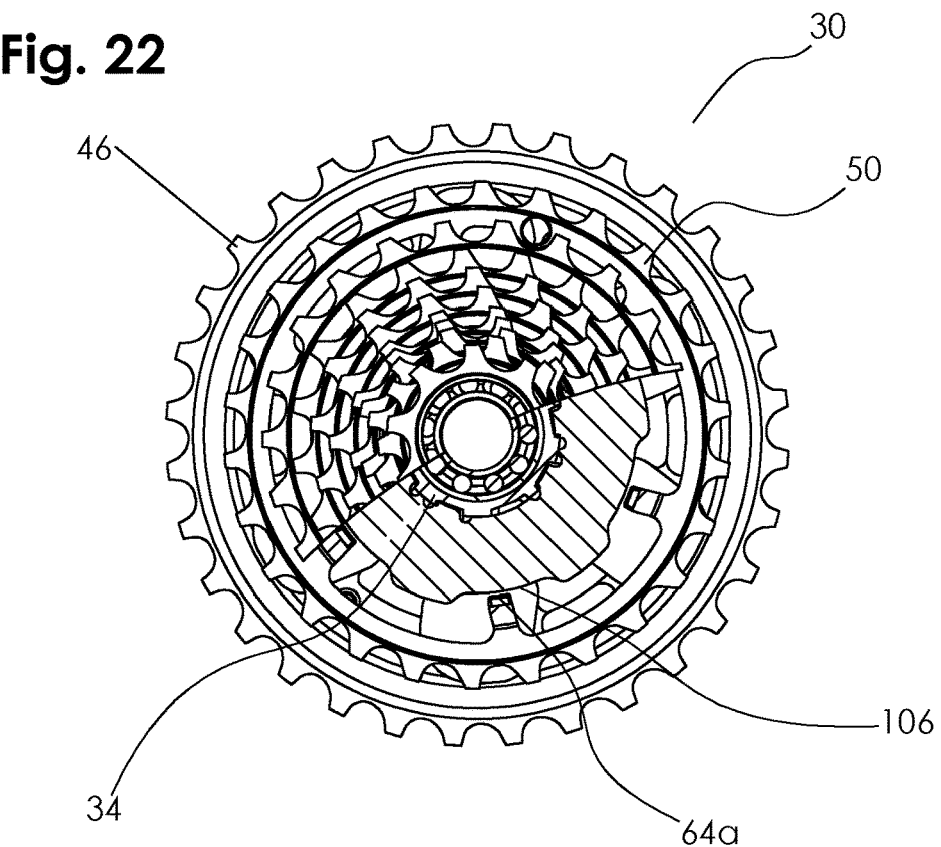
FIG. 22 illustrates a right side breakout section view of a complete cassette assembly in an un-locked position, in accordance with some embodiments.

FIG. 22 shows a broken out section view of the complete cassette assembly 30 with the cassette large sprocket sub-assembly 46 and the cassette small sprocket sub-assembly 50 in the unlocked, installation position. In this orientation, a locking tang 64a is aligned with a locking flange cutout 106, so that the cassette small sprocket sub-assembly 50 may slide into place on the hub driver assembly 34.

Figure 23:
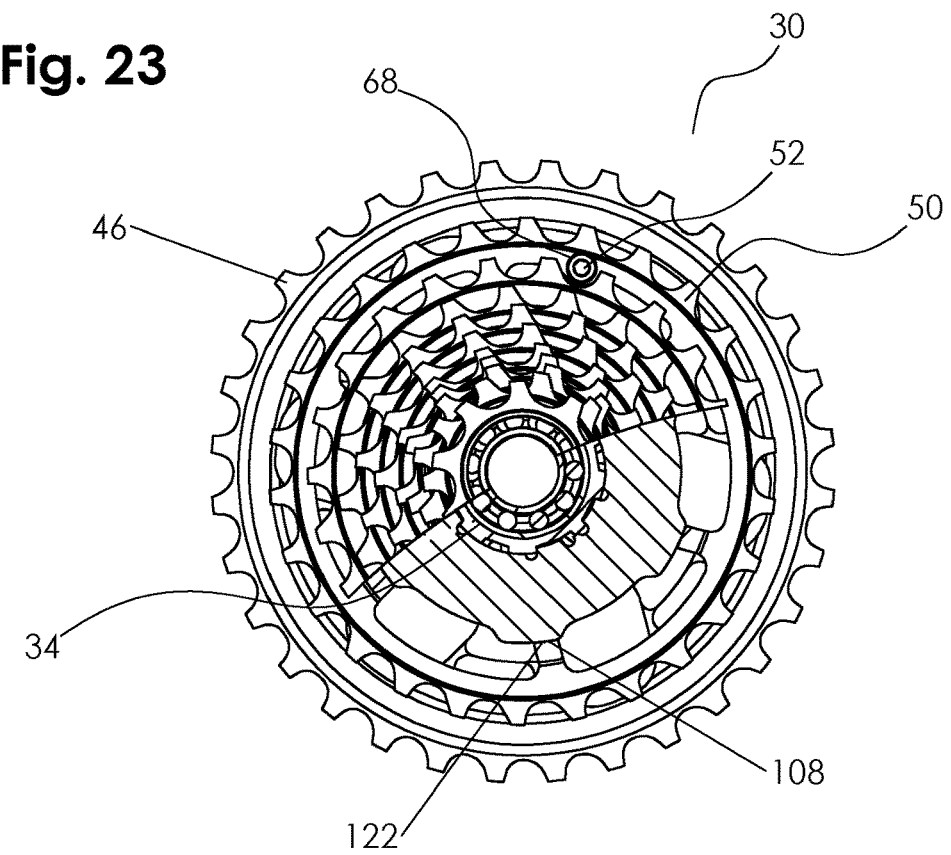
FIG. 23 illustrates a right side breakout section view of a complete cassette assembly in a locked position, in accordance with some embodiments.

FIG. 23 shows the same broken-out section view with the cassette small sprocket sub-assembly 50 rotated clockwise so that the small sprocket portion assembly is locked to the cassette large sprocket sub-assembly 46. In this orientation a locking tang radial clearance 122 couples with a locking flange radial surface 108. The cassette locking screw 52 is installed through the small sprocket portion locking hole 68 and threaded into the locking screw receiving hole 78 (not visible)

Figure 24:
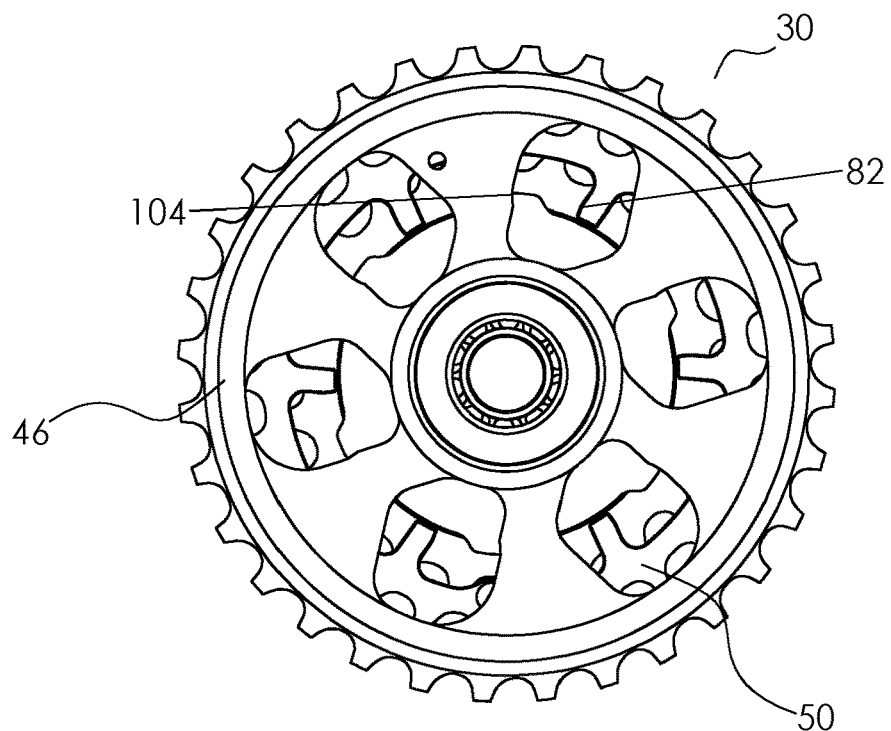
FIG. 24 illustrates a left side view of a complete cassette assembly in an un-locked position, in accordance with some embodiments.

FIG. 24 shows a left side view of the complete cassette assembly 30 with the cassette large sprocket sub-assembly 46 and the cassette small sprocket sub-assembly 50 in the unlocked, installation position. In this view, a torque driving face 116 is not yet in contact with a torque Receiving Face 104.

Figure 25:
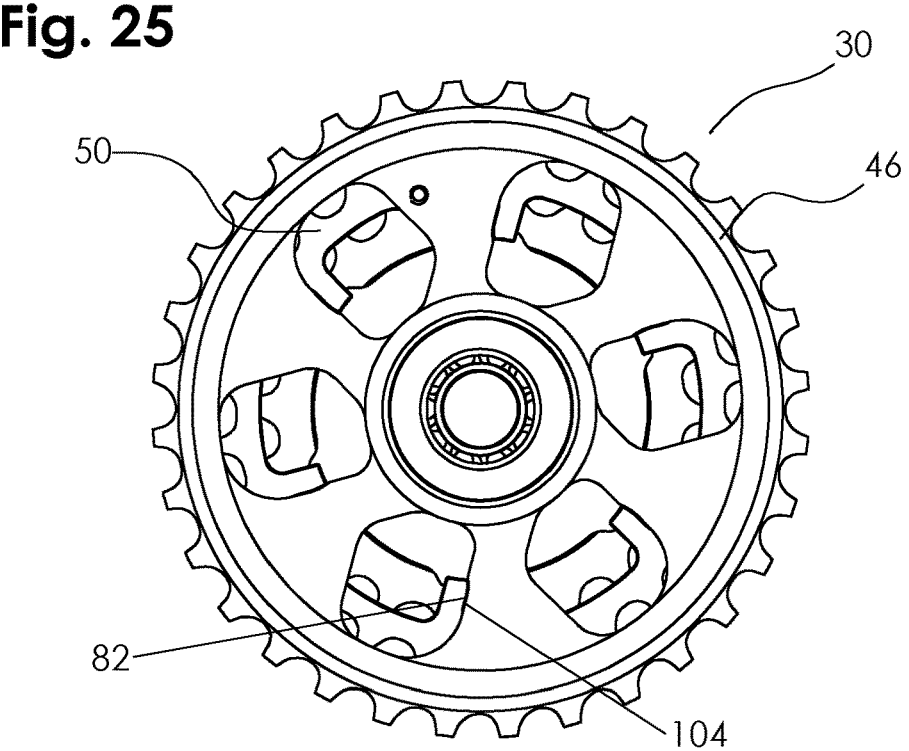
FIG. 25 illustrates a left side view of a complete cassette assembly in a locked position, in accordance with some embodiments.

FIG. 25 shows the same broken out section view as FIG. 23 of the complete cassette assembly 30 with the cassette large sprocket sub-assembly 46 and the cassette small sprocket sub-assembly 50 rotated clockwise into the locking position. In this view, a torque driving face 82 is in contact with a torque receiving face 104.

Figure 26:
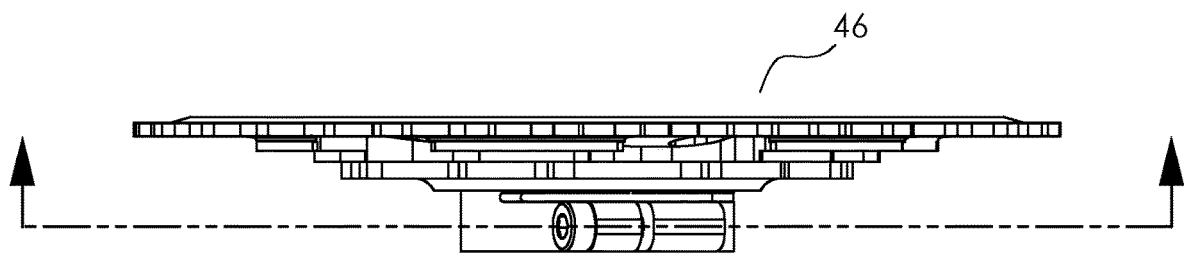
FIG. 26 illustrates a top view of a cassette large sprocket sub-assembly, in accordance with some embodiments.
Figure 27:
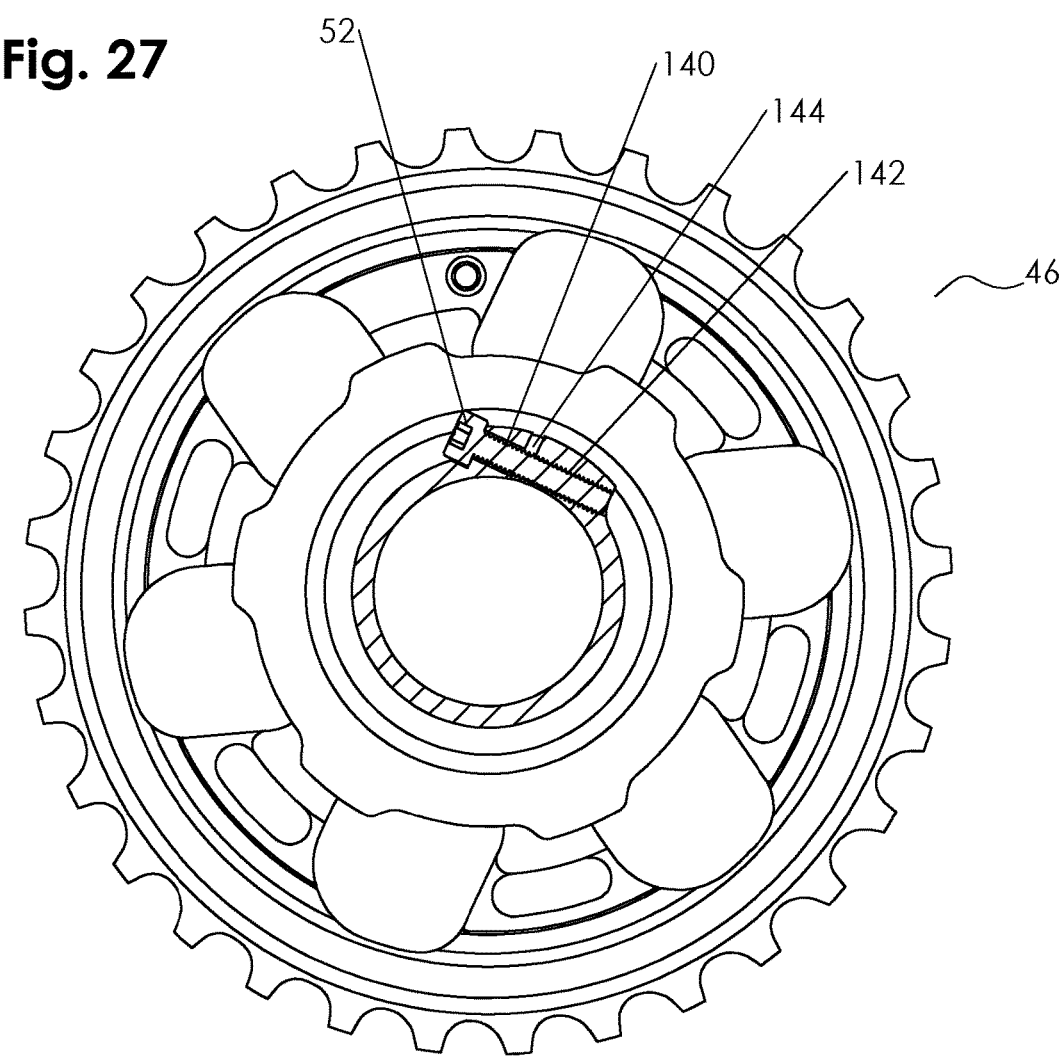
FIG. 27 illustrates a right section view of a cassette large sprocket sub-assembly, in accordance with some embodiments.

FIG. 26 shows a top view of the cassette large sprocket sub-assembly 46. FIG. 27 shows a right side section view of the cassette large sprocket sub-assembly 46, including the cassette locking screw 52 which passes through the clamp screw clearance hole 140, bridges the clamp clearance slot 144 and threads into the clamp screw threaded hole 142.

Figure 28:
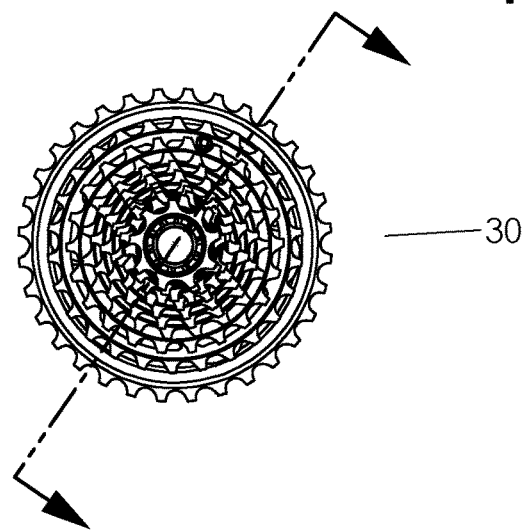
FIG. 28 illustrates a right side view of a complete cassette assembly mounted to a hub driver, in accordance with some embodiments.
Figure 29:
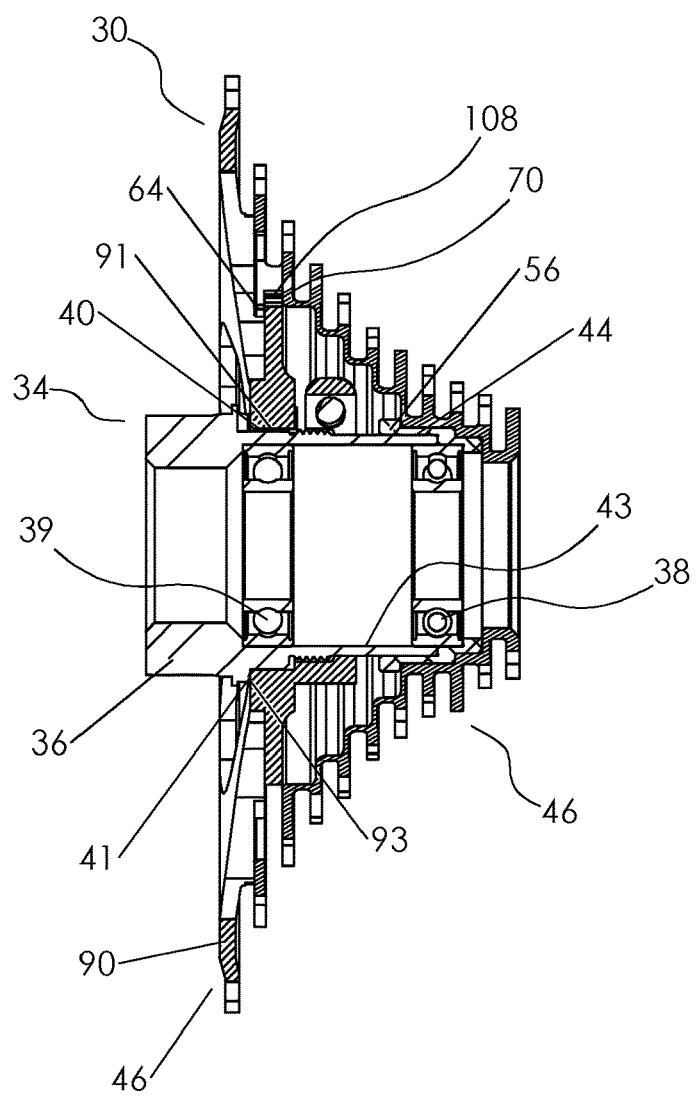
FIG. 29 illustrates a section view of a complete cassette assembly mounted to a hub driver, in accordance with some embodiments.

FIGS. 28 and 29 show a cross section of the complete cassette assembly 30 mounted to the hub driver assembly 34. Shown in the cross section are many of the critical features of the complete cassette assembly 30 in their mounted and locked configuration. The cassette assembly 30 is built on the hub driver assembly 34, which includes a hub driver body 36. Two bearings, an outboard hub driver bearing 38 and an inboard hub driver bearing 39 are fitted in the inner hub driver bearing bore 43.

The large sprocket portion 90 is fitted onto the hub driver body 36 so that the large sprocket driver torque coupling 91 engages the hub driver torque coupling 40, and the large sprocket coupling stop face 93 contacts the hub driver cassette stop face 41.

The cassette small sprocket sub-assembly 50 is installed on the cassette large sprocket sub-assembly 46 and the hub driver assembly 34, so that the cassette small sprocket bushing 56 rests on the hub driver right-end radial surface 44.

The locking flange 108 is coupled between the locking tang 64 and the first small sprocket portion axial locating face 70.

Figure 30:
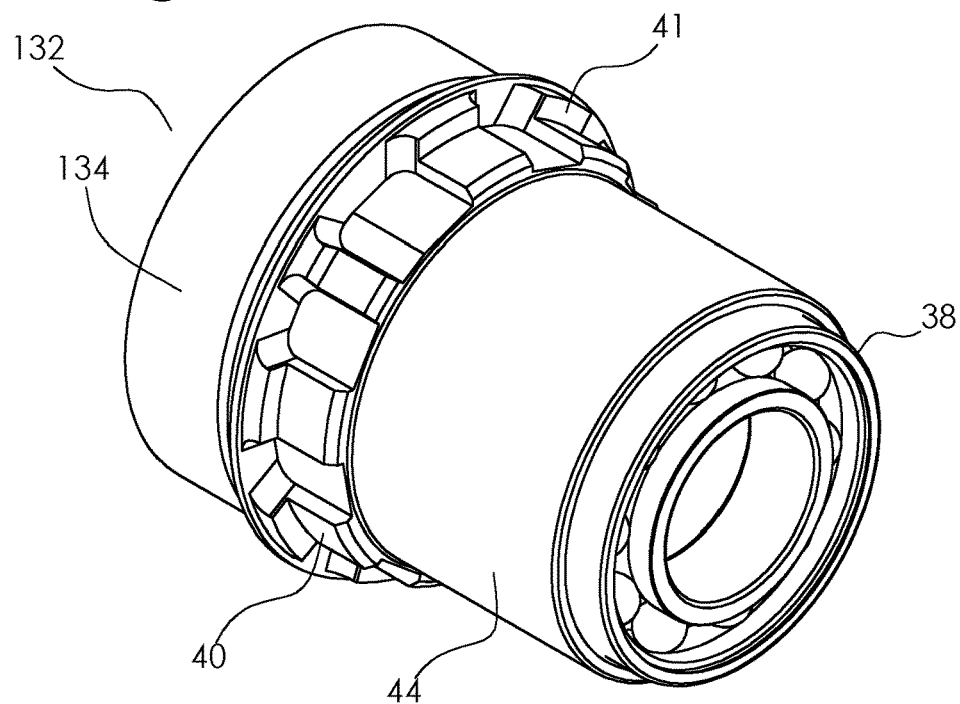
FIG. 30 illustrates an isometric right view of an alternative hub driver assembly, in accordance with some embodiments.

As shown in FIG. 30, in some embodiments, a hub driver assembly 34 includes a hub driver body 134, an outboard hub driver bearing 38, a hub driver torque coupling 40, a hub driver cassette stop face 41, a hub driver thread 42 and a hub driver right-end radial surface 44.

Figure 31:
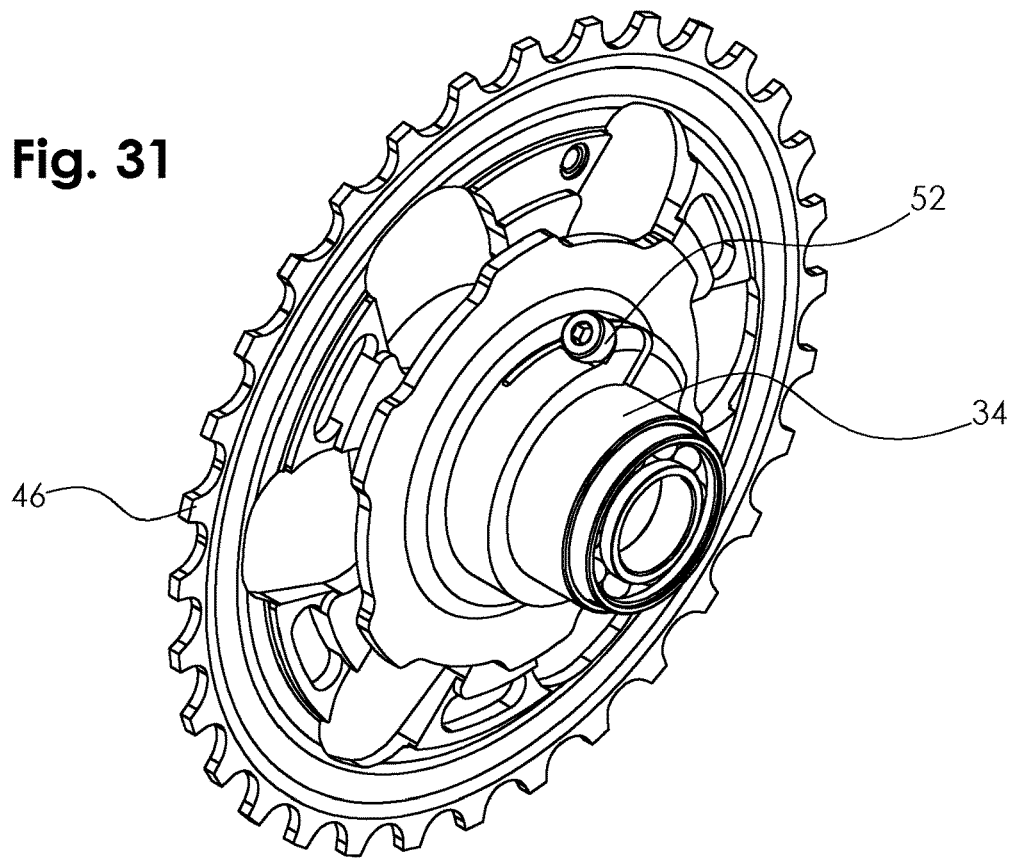
FIG. 31 illustrates an isometric right view of a cassette large sprocket sub-assembly mounted to a hub driver, in accordance with some embodiments.

FIG. 31 shows a cassette large sprocket sub-assembly 46 with the cassette locking screw 52 installed, coupled to said hub driver assembly 34, prior to installation of the cassette small sprocket sub-assembly 50.

A complete cassette assembly 30 is able to be assembled onto a rear bicycle hub 32 using tools known to bicycle mechanics and others familiar with bicycle construction and assembly. In some embodiments, the tools needed for assembly of the cassette assembly 30 as shown in the drawings are a hex key or other tool fitted to the cassette locking screw 52 and the cassette clamp screw 92. In some embodiments, assembly may accomplished by using the same tool interface on said screws, such that one tool is sufficient to assemble or mount and/or demount the cassette assembly 30 from the hub 32.

To assemble the complete cassette assembly 30, the cassette large sprocket sub-assembly 46 is slid over the hub driver right-end radial surface 44 towards the left end of the rear bicycle hub 32 until the large sprocket driver torque coupling 91 is engaged with the hub driver torque coupling 40. The large sprocket coupling stop face 93 is pressed against the hub driver cassette stop face 41.

Once the cassette large sprocket sub-assembly 46 is completely engaged on the hub 32, the large sprocket clamp screw 92 is tightened to an appropriate torque value using the hex key or other tool. Applying torque to the screw closes the clamp clearance Slot 144, and creates pressure between the clamp contact surface 150 and the hub driver right-end radial surface 44, which in turn prevents the large sprocket sub-assembly 46 from moving on the hub driver body 36.

In some embodiments, the thread clearance bore 152 on the large sprocket portion 90 allows the large sprocket portion to assemble to the hub driver body 36 without use of the hub driver thread 42. Particularly, in some embodiments, the hub driver body 134 is made without a driver thread.

After tightening the large sprocket clamp screw 92, the cassette small sprocket sub-assembly 50 is able to be installed. To install the small sprocket sub-assembly 50, the bushing inner stepped surface 59 is aligned with the hub driver right-end radial surface 44, and the locking tangs 64 are aligned with the locking flange cutouts 106.

After proper alignment, the cassette small sprocket sub-assembly 50 is slid towards the left end of the rear bicycle hub 32 until the second small sprocket portion axial locating face 72 contacts the locking flange inside surface face 110. Once the cassette small sprocket sub-assembly 50 is in place, it is able to be rotated by hand or with the use of a tool in the clockwise direction relative to the cassette large sprocket sub-assembly 46, until a torque driving face 82 contacts a torque receiving face 104. At this point the cassette small sprocket sub-assembly 50 can no longer move to the left along the hub axis because the locking flanges 114 are contained between the first small sprocket portion axial locating face 70 and the locking tangs 64.

Next, the cassette locking screw 52 is inserted into the locking screw receiving hole 78 through the small sprocket portion locking hole 68, and tightened using an appropriate tool. Once appropriate torque has been applied to said screw, the cassette is fully installed.

To disassemble the cassette small sprocket sub-assembly 50 from the cassette large sprocket sub-assembly 46, the cassette locking screw 52 is unthreaded from the locking screw receiving hole 78 using an appropriate tool. Once the screw 52 is unthreaded, it may be set aside.

Next, the cassette large sprocket sub-assembly 46 is held stationary, while the cassette small sprocket sub-assembly 50 is rotated counter-clockwise until the locking tangs 64 are aligned with the locking flange cutouts 106. When the locking tangs 64 are aligned with the locking flange cutouts 106, it is possible to slidably remove the small sprocket sub-assembly 50 from the rear bicycle hub 32.

After the small sprocket sub-assembly 50 is removed from the rear bicycle hub 32, the large sprocket clamp screw 92 is able to be loosened with an appropriate tool. Once the screw 92 is loosened, tension is relieved in the large portion clamp 138. With tension relieved, the cassette large sprocket sub-assembly 46 is able to be removed from the hub driver assembly 34.

With the cassette assembly 30 installed, tension in a bicycle chain applies a clockwise torque to one of the sprockets of the complete cassette assembly 30, including the large portion sprocket 94, or small sprocket portion sprockets 60(*a-j*). When torque is applied to the small portion sprockets, torque is transferred to the cassette large sprocket sub-assembly 46 through the torque driving face 82/torque receiving face 104 interface. The torque is then transferred to the hub driver assembly 34 through the hub driver torque coupling 40/large sprocket driver torque coupling 91 interface. The cassette locking screw 52 resists spontaneous disassembly from abnormal chain loads encountered during bicycle riding activity.

As described above, an assembled cassette 30 shows 11 sprockets, ranging from 9 teeth on the smallest sprocket to 32 teeth on the largest sprocket. Alternative embodiments of the cassette could include anywhere from 2 to 14 sprockets. Current bicycle drivetrains consist of between 8 and 12 sprockets in the rear cassette. However, an assembled cassette is able to utilize any appropriately desired number of sprockets. For example, in some embodiments, the cassette is able to comprise 12, 13 or 14 sprockets attached to the rear hub of a bicycle.

In some embodiments, some or all of the sprockets in the assembly are stamped from sheet material and riveted or attached through some other method to a series of central carriers which contain the torque-transferring features of the invention. For instance, one or more steel sprockets could be riveted or otherwise fixed to a central aluminum piece to form the cassette large sprocket sub-assembly 46. The same construction method is able to be used for the cassette small sprocket portion 54.

Alternatively, in some embodiments, some or all of the sprockets on the cassette small sprocket portion 54 are manufactured from a different material and attached to the remaining small sprocket portion 54, such that lightweight materials such as aluminum or titanium could be used for some sprockets on the portion, while others were machined directly onto the portion. In this way, weight and durability is able to be fine-tuned as seen fit by the designer.

In further embodiments, the large sprocket portion 90 is able to be combined with the hub driver body 36 and manufactured from one piece of material. In this case, the large portion clamp 38 is able to be eliminated, and assembly would be further simplified.

In still further embodiments, the number of repeated circular arrangement of features on the cassette could be considered. For instance, while six locking tangs 64 are shown in the preferred embodiment, any appropriately desired number could be used. For example, in some embodiments, 1 to 6 locking tangs are use. However, more or less are able to be added as necessary. Similarly, while one cassette locking screw 52 is shown, two or more screws could be utilized to add redundancy to the assembly.

Additionally, in some embodiments, the number of torque transferring feature sets (torque receiving face 104/torque driving face 82, locking tangs 64, locking tang pads 124) are able to be increased or decreased as necessary to suit different space constraints and different usage cases, using more features for higher torque loads and less features for less rigorous applications. Also there is no strict requirement that the number of torque interfaces match the number of tang interfaces, so axial retention could be separated from torque driving capacity if necessary or prudent.

In some embodiments, the orientation and location of the torque transferring features that pass torque between the cassette small sprocket sub-assembly 50 and the cassette large sprocket sub-assembly 46 are able to be altered. For instance, the locking tangs 64 are able to be oriented so that they grip the inside diameter of the locking flange 108, rather than the outside diameter. Alternately, in some embodiments, the locking tangs 64 are able to project from the cassette large sprocket sub-assembly 46, and the locking flange 108 is able to be located on the cassette small sprocket sub-assembly 50, in effect reversing the orientation of the attachment features.

In addition, the locking mechanism is able to comprise any appropriately desired mechanism. For example, instead of the cassette locking screw 52, spring loaded ball plungers are able to be substituted. Another alternative locking feature is a leaf spring arrangement whereby a formed leaf spring with a formed tooth is attached to the cassette large sprocket sub-assembly 46, and the tooth acts on a machined feature of the cassette small sprocket sub-assembly 50. Alternatively, in some embodiments, a set screw or other locking screw is used to lock the two pieces together once the cassette small sprocket sub-assembly 50 has been installed. In further embodiments, a screw threaded into a hole in the cassette small sprocket sub-assembly 50 is able to engage a hole or depression in the cassette large sprocket sub-Assembly 46, or vice versa.

In further embodiments, a pin or plunger in shear is able to be installed in the large sprocket sub-assembly 46 or the cassette small sprocket sub-assembly 50 so that once the two assemblies are twisted together, the plunger or pin slides into a hole in the other piece and prevents back-rotation and disassembly of the two assemblies.

In some embodiments, the large portion clamp 138 is able to comprise a collet style clamp to provide adequate clamping force, where an externally threaded collet is formed on the cassette large sprocket portion 90 with the large portion clamp 138. In this embodiment, the collet is able to comprise an external thread, a tapered outer surface, and several slots through the clamp. The collet is able to be clamped in place by installing an internally threaded nut with a mating tapered surface, such that when the nut is tightened and the tapered surfaces come together, the inside diameter of the clamp compresses the outside diameter of the hub driver right-end radial surface 44.

Embodiments of a bicycle cassette comprise a clampstyle connection for connecting the bicycle cassette to a bicycle hub driver body. The bicycle cassette is attached to a bicycle hub driver body by incorporating a clamp structure into one portion of the cassette, which then rigidly clamps onto the driver body of the bicycle hub. In addition, when combined with a bayonet style attachment structure between two parts of the cassette, it allows for the use of a smaller sprocket on one segment of the cassette. Specifically, it allows a small 9 or 10 tooth sprocket to overhang the cassette driver body on a bicycle hub, by attaching the small cog assembly to a larger cog assembly using a bayonet style attachment.

In use, the bicycle cassette uses the mechanical advantage of a clamp to reduce the tool force necessary to lock the cassette onto the driver body of a hub. In many traditional cassette assemblies, a large internally or externally threaded fastener is used to clamp an arrangement of different sized sprockets together on a driver body to form a cassette. These fasteners require special tools and high torque to prevent movement and creaking in the cassette assembly. In my invention, a small fastener is all that is necessary to hold the entire cassette assembly stationary on the driver body.

Additionally, the bicycle cassette such as described above, is able to isolate the locking force for the cassette into one region of the assembly, and isolates the driving force from the cassette to the hub in another. The driving force is handled exclusively by a spline feature or other torque transmitting feature, and the axial location and locking of the cassette is managed exclusively by the clamp feature. In this way, each part can be designed to handle exactly the load necessary for proper function of the system.

Further, by minimizing the size of the torque transmitting feature connecting the cassette to the driver body, space is freed up to use smaller sprockets on the small end of the cassette. In many previous cassette assemblies, each one of many sprockets has a spline on its inner surface which connects it to the driver body. In these prior assemblies, a long spline runs the length of driver body, and in fact can limit the size of the smallest sprocket in the cassette, usually to 11 teeth. The cassette such as described above, allows the use of a small 9 tooth sprocket on the small end of the cassette.

Additionally, different portions of the cassette assembly are able to be manufactured from different materials to allow a balance to be struck between system weight and sprocket strength. For example, the largest sprockets of the cassette assembly may be manufactured from aluminum to save weight and to allow the clamp to function properly, and the smaller sprockets may be manufactured from steel or titanium to decrease wear from the chain in operation.

Further the present invention reduces the number of steps required to assemble a bicycle cassette onto a bicycle hub cassette driver body, by eliminating the need to stack many sprockets onto a splined driver before locking the assembly together with a nut. With the invention, the cassette assembly consists of only two finished assemblies, one clamping fastener and a locking fastener. These parts are keyed so they only fit together one way, which further simplifies the assembly process.

Moreover, installation and/or service is able to be accomplished with simple, commonly available hand tools such as hex keys. Because installation may be accomplished with low tool force, the cassette may be easily serviced even on the road or trail during the course of a ride, where previous cassette assemblies require specialized tools which cyclists generally don't carry with them on rides. As such, the bicycle cassette with a clamping connection such as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A bicycle cassette comprising:
   a. a large sprocket sub-assembly comprising a clamping mechanism for attaching the large sprocket sub-assembly to a rear bicycle hub, wherein the large sprocket sub-assembly clamps to an outside radial profile of the rear bicycle hub; and b. a small sprocket sub-assembly, wherein the small sprocket sub-assembly rotatably couples with and locks to the large sprocket sub-assembly after the large sprocket assembly is clamped to the rear bicycle hub to form the bicycle cassette.

2. The bicycle cassette of claim 1, wherein the large sprocket sub-assembly clamps to the rear bicycle hub by tightening a clamp screw.

3. A bicycle cassette comprising:

a. a large sprocket sub-assembly comprising a clamping mechanism for attaching the large sprocket sub-assembly to a rear bicycle hub; and b. a small sprocket sub-assembly, wherein the small sprocket sub-assembly rotatably couples with and locks to the large sprocket sub-assembly after the large sprocket assembly is clamped to the rear bicycle hub to form the bicycle cassette, wherein the small sprocket sub-assembly is coupled to the large sprocket assembly using a locking bayonet style attachment.

4. The bicycle cassette of claim 1, wherein the small sprocket sub-assembly comprises a 9 tooth sprocket.

5. The bicycle cassette of claim 1, wherein the small sprocket sub-assembly comprises a 10 tooth sprocket.

6. The bicycle cassette of claim 1, wherein the large sprocket sub-assembly comprises a 46 tooth sprocket.

7. The bicycle cassette of claim 1, wherein the large sprocket sub-assembly comprises a 50 tooth sprocket.

8. The bicycle cassette of claim 1, wherein the large sprocket sub-assembly and the small sprocket assembly are manufactured from different materials.

9. The bicycle cassette of claim 1, wherein the small sprocket sub-assembly overhangs a cassette driver body of the bicycle hub in an assembled configuration.

10. The bicycle cassette of claim 1, wherein the small sprocket sub-assembly comprises a bushing, which radially supports said small sprocket sub-assembly on the cassette driver body of the bicycle hub in the assembled configuration.

11. A bicycle cassette and hub system comprising;

a. a rear bicycle hub;

b. a hub driver assembly coupled to the rear bicycle hub; and c. a cassette assembly clamped to the hub driver assembly, the cassette assembly comprising:

i. a large sprocket sub-assembly comprising a clamping mechanism for clamping the large sprocket sub-assembly to the hub driver assembly, wherein the large sprocket sub-assembly clamps to an outside radial profile of the rear bicycle hub; and ii. a small sprocket sub-assembly, wherein the small sprocket sub-assembly rotatably couples with and locks to the large sprocket sub-assembly after the large sprocket assembly is clamped to the rear bicycle hub to form the bicycle cassette assembly.

12. The bicycle cassette and hub system of claim 11, wherein the large sprocket sub-assembly clamps to the hub driver assembly by tightening a clamp screw.

13. A bicycle cassette and hub system comprising;

a. a rear bicycle hub;

b. a hub driver assembly coupled to the rear bicycle hub; and c. a cassette assembly clamped to the hub driver assembly, the cassette assembly comprising:

i. a large sprocket sub-assembly comprising a clamping mechanism for clamping the large sprocket sub-assembly to the hub driver assembly; and ii. a small sprocket sub-assembly, wherein the small sprocket sub-assembly rotatably couples with and locks to the large sprocket sub-assembly after the large sprocket assembly is clamped to the rear bicycle hub to form the bicycle cassette assembly, wherein the small sprocket sub-assembly is coupled to the large sprocket sub-assembly using a locking bayonet style attachment.

14. The bicycle cassette and hub system of claim 11, wherein the small sprocket sub-assembly comprises a 9 tooth sprocket.

15. The bicycle cassette and hub system of claim 11, wherein the small sprocket sub-assembly comprises a 10 tooth sprocket.

16. The bicycle cassette and hub system of claim 11, wherein the large sprocket sub-assembly comprises a 46 tooth sprocket.

17. The bicycle cassette and hub system of claim 11, wherein the large sprocket sub-assembly comprises a 50 tooth sprocket.

18. The bicycle cassette and hub system of claim 11, wherein the large sprocket assembly and the small sprocket assembly are manufactured from different materials.

19. The bicycle cassette and hub system of claim 11, wherein the small sprocket sub-assembly overhangs the hub driver assembly in an assembled configuration.

20. The bicycle cassette and hub system of claim 11, wherein the small sprocket sub-assembly comprises a bushing, which radially supports said small sprocket sub-assembly on the cassette driver body of the bicycle hub in the assembled configuration.

* * * * *